(12) United States Patent
Kurebayashi

(10) Patent No.: US 10,099,136 B2
(45) Date of Patent: Oct. 16, 2018

(54) GAMING SYSTEM AND METHOD OF USING THE SAME

(71) Applicant: COLOPL, INC., Tokyo (JP)

(72) Inventor: Hajime Kurebayashi, Saitama (JP)

(73) Assignee: COLOPL, INC., Tokyo (JP)

( * ) Notice: Subject to any disclaimer, the term of this patent is extended or adjusted under 35 U.S.C. 154(b) by 85 days.

(21) Appl. No.: 15/264,512

(22) Filed: Sep. 13, 2016

(65) Prior Publication Data
US 2017/0197147 A1 Jul. 13, 2017

(30) Foreign Application Priority Data

Jul. 22, 2015 (JP) ................................. 2015-145311

(51) Int. Cl.
| | |
|---|---|
| A63F 13/822 | (2014.01) |
| A63F 13/58 | (2014.01) |
| A63F 13/63 | (2014.01) |
| A63F 13/35 | (2014.01) |
| A63F 13/46 | (2014.01) |
| A63F 13/2145 | (2014.01) |

(52) U.S. Cl.
CPC ............ *A63F 13/58* (2014.09); *A63F 13/35* (2014.09); *A63F 13/46* (2014.09); *A63F 13/63* (2014.09); *A63F 13/822* (2014.09); *A63F 13/2145* (2014.09)

(58) Field of Classification Search
None
See application file for complete search history.

(56) References Cited

U.S. PATENT DOCUMENTS

| | | | |
|---|---|---|---|
| 7,980,913 B1* | 7/2011 | D'Avanzo | A63H 18/02 446/175 |
| 2007/0207844 A1* | 9/2007 | Pottinger | A63F 13/10 463/9 |
| 2012/0329556 A1* | 12/2012 | Eddy | A63F 13/10 463/30 |
| 2016/0107085 A1 | 4/2016 | Eda | |

FOREIGN PATENT DOCUMENTS

| | | |
|---|---|---|
| JP | 2014-223471 A | 12/2014 |
| WO | 2015/046447 A | 4/2015 |

* cited by examiner

*Primary Examiner* — Damon Pierce
(74) *Attorney, Agent, or Firm* — Hauptman Ham, LLP

(57) ABSTRACT

A gaming system includes a non-transitory computer readable medium for storing a game program; and a computer connected to the non-transitory computer readable medium. The computer is configured to execute the game program for building a competition game space to be shared by a plurality of users including a first user and a second user through a network. The computer is further for updating a game point, which is associated with a predetermined user and a game object associated with the predetermined user, based on arranging of the game object in the competition game space. The computer is further for conducting processing so as to inhibit the game object from being arranged in the competition game space after a competition time period has elapsed since the competition game space is built. The computer is further for comparing the game points associated with each user to select a winner.

18 Claims, 23 Drawing Sheets

| USER | POSSESSED COIN | POSSESSED ITEM | POSSESSED DIAMOND | POSSESSED OBJECT | ARRANGEMENT POSITION | STATUS | ELAPSED TIME PERIOD | POSSESSED POPULATION |
|---|---|---|---|---|---|---|---|---|
| A | 1000 | VEGETABLE 1<br>CHAIR 2 | 25 | APARTMENT BUILDING | X1/Y1 | COMPLETED | 150 SECONDS | 3000 |
| | | | | STORE | X1/Y1 | COMPLETED | 150 SECONDS | 0 |
| | | | | FARMLAND | X2/Y2 | COMPLETED | 120 SECONDS | 0 |
| | | | | FIRE STATION | X3/Y3 | UNDER CONSTRUCTION | 300 SECONDS | 0 |
| | | | | ... | ... | ... | ... | ... |
| ... | ... | ... | | ... | ... | ... | ... | ... |

| OBJECT NAME | TYPE | POPULATION THAT CAN BE POSSESSED | POWER SUPPLY AMOUNT | POWER CONSUMPTION AMOUNT | COIN PRODUCTION AMOUNT | ITEM PRODUCED | BUILDING TIME PERIOD | PREPARATION TIME PERIOD | ... |
|---|---|---|---|---|---|---|---|---|---|
| APARTMENT BUILDING | RESIDENCE | 1000 | 0 | 200 | 0 | NONE | 3 HOURS | NONE | ... |
| STORE | COMMERCIAL FACILITY | 0 | 0 | 100 | 300 | NONE | 10 MINUTES | 15 MINUTES | ... |
| FARMLAND | PRODUCTION FACILITY | 0 | 0 | 20 | 0 | VEGETABLE | 30 MINUTES | 30 MINUTES | ... |
| PARK | PUBLIC FACILITY | 0 | 0 | 0 | 0 | 0 | 5 MINUTES | NONE | ... |
| POWER PLANT | LIFELINE | 0 | 500 | 0 | 0 | 0 | 40 MINUTES | NONE | ... |
| FIRE STATION | PUBLIC FACILITY | 0 | 0 | 50 | 0 | NONE | 40 MINUTES | NONE | ... |
| ... | ... | ... | | | ... | ... | ... | ... | ... |

| OBJECT NAME | CONTENT OF SKILL | EFFECTIVE RANGE | ... |
|---|---|---|---|
| PARK | TO INCREASE POPULATION OF BUILDING WITHIN EFFECTIVE RANGE BY 300 | 5×5 | ... |
| POWER PLANT | TO DECREASE POPULATION OF BUILDING WITHIN EFFECTIVE RANGE BY 200 | 5×5 | ... |
| ... | ... | | ... |

| OBJECT NAME | CONTENT OF SKILL | EFFECTIVE RANGE | COOLDOWN TIME | ... |
|---|---|---|---|---|
| FIRE STATION | TO EXTINGUISH FIRE IN BUILDING WITHIN EFFECTIVE RANGE | 9×9 | 1 HOUR | ... |
| ... | ... | | ... | ... |

| USER | POSSES SED COIN | POSSESS ED ITEM | POSSES SED DIAMO ND | POSSESSED OBJECT | ARRANGE MENT POSITION | STATUS | ELAPSED TIME PERIOD | POSSESSED POPULATION | UTILIZATION DEGREE |
|---|---|---|---|---|---|---|---|---|---|
| A | 0 | NONE | 25 | APARTMENT BUILDING | WAREHOU SE | NOT BUILT | 0 SECOND | 0 | 0 |
| | | | | STORE | X1/Y1 | COMPLE TED | 20 SECONDS | 0 | 0.7 |
| | | | | FARMLAND | X2/Y2 | COMPLE TED | 100 SECONDS | 0 | 0.7 |
| | | | | FIRE STATION | X3/Y3 | UNDER CONSTR UCTION | 30 SECONDS | 0 | 0.25 |
| | | | | ... | ... | ... | ... | ... | ... |
| B | ... | ... | ... | ... | ... | ... | ... | ... | ... |
| C | ... | ... | ... | ... | ... | ... | ... | ... | ... |
| D | ... | ... | ... | ... | ... | ... | ... | ... | ... |

Fig. 27

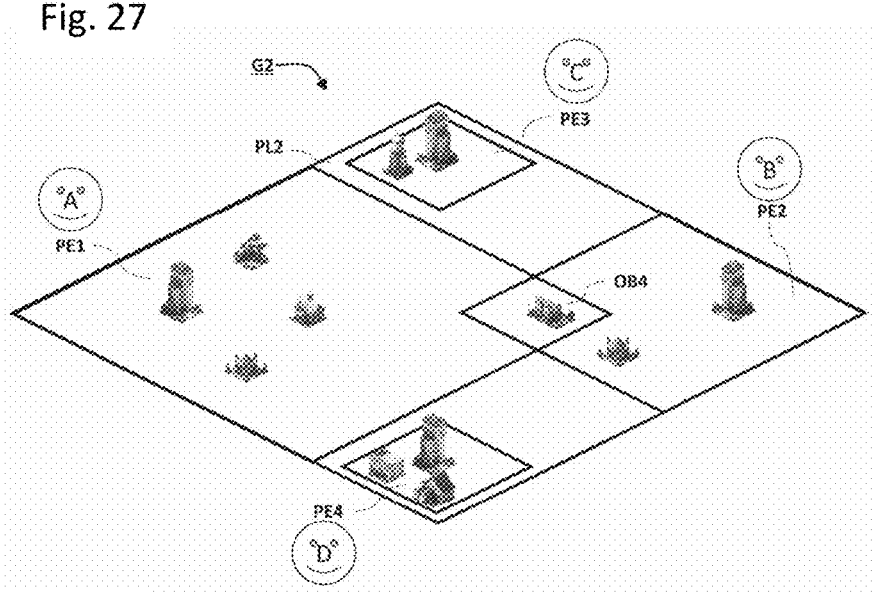

| OBJECT NAME | TYPE OF OBJECT | REFERENCE PRICE | METHOD OF CALCULATING UTILIZATION DEGREE |
|---|---|---|---|
| APARTMENT BUILDING | RESIDENCE | 50000 | POPULATION FILL RATE ((POSSESSED OPERATION)/(POPULATION THAT CAN BE POSSESSED)) |
| STORE | COMMERCIAL FACILITY | 15000 | FIXED TO 0.7 |
| FARMLAND | PRODUCTION FACILITY | 10000 | FIXED TO 0.7 |
| PARK | PUBLIC FACILITY | 12000 | (AREA OF BUILDING ON WHICH INFLUENCE IS EXERTED)/(AREA OF EFFECTIVE RANGE) |
| POWER PLANT | LIFELINE | 40000 | USAGE RATIO ((TOTAL OF POWER CONSUMPTION AMOUNT)/(POWER SUPPLY AMOUNT)) |
| FIRE STATION | PUBLIC FACILITY | 30000 | (AREA OF BUILDING ON WHICH INFLUENCE IS EXERTED)/(AREA OF EFFECTIVE RANGE) |
| ... | ... | ... | |

GAMING SYSTEM AND METHOD OF USING THE SAME

RELATED APPLICATIONS

The present application claims priority to Japanese Application Number 2015-145311, filed Jul. 22, 2015, the disclosure of which is hereby incorporated by reference herein in its entirety.

FIELD

This disclosure relates to a gaming system and a method using the same.

BACKGROUND

Encampment simulation games are configured to allow a plurality of users to share a common game space through a network and to compete to expand their own territories through user actions. In Japanese Patent Application Laid-open No. 2014-223471 and WO 2015/046447 A1, there are disclosed games configured to allow a game player who has built a larger number of more advanced facilities to progress the game more advantageously than another game player.

In the games disclosed in Japanese Patent Application Laid-open No. 2014-223471 and WO 2015/046447 A1, an element for strengthening a base, e.g., city building, is used as a measure to, for example, strengthen the game player's own military force in preparation for a battle against another game player's troop, and is not an element for giving a game point that determines a win-loss outcome of the game based on the city building itself.

SUMMARY

This disclosure helps to enhance game enjoyment in a city-building element.

According to at least one embodiment of this disclosure, there is gaming system including a non-transitory computer readable medium for storing a game program for causing a computer to build a game space to be shared by a first team associated with a plurality of first users and a second team associated with a plurality of second users through a network. The game program is further configured to cause the computer to update a first game point associated with the first team based on arranging of a first object associated with any one of the first users in the game space. The game program is further configured to cause the computer to update a second game point associated with the second team based on arranging of a second object associated with any one of the second users in the game space. The game program is further configured to cause the computer to receive an action exerted on the first object by any one of the first users, and update a game parameter of any one of the first user and the first object.

According to this disclosure, the game enjoyment in a city-building element can be enhanced.

BRIEF DESCRIPTION OF THE DRAWINGS

FIG. 5 is a table for showing an example of a user management table according to at least one embodiment.

FIG. 6 is a table for showing an example of an object management table according to at least one embodiment.

FIG. 7 is a table for showing an example of a passive skill management table according to at least one embodiment.

FIG. 8 is a table for showing an example of an active skill management table according to at least one embodiment.

FIG. 20 is a table for showing at least one example of a competing user management table.

FIG. 27 is a diagram for illustrating at least one example of the competition game space.

FIG. 28 is a table for showing at least one example of a purchase price calculation table.

DETAILED DESCRIPTION

Figure 1:
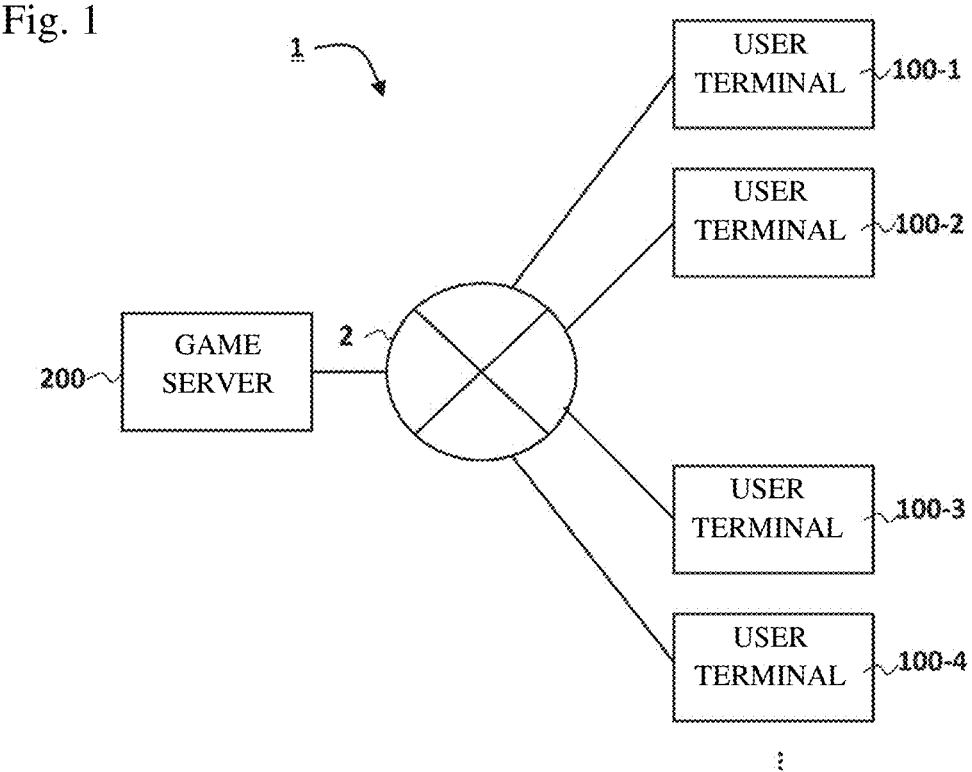
FIG. 1 is a diagram for illustrating a game system according to at least one embodiment of this disclosure.

First, a description is made of at least one embodiment of this disclosure by listing contents thereof. A game program according to at least one embodiment of this disclosure includes the following configurations.

(Item 1)

A gaming system including a non-transitory computer readable medium for storing a game program for causing a computer to build a competition game space to be shared by a plurality of users including a first user and a second user through a network. The game program is further configured to cause the computer to update a game point, which is associated with a predetermined user and a game object associated with the predetermined user, based on arranging of the game object in the competition game space. The game program is further configured to cause the computer to conduct processing so as to inhibit the game object from being arranged in the competition game space after a competition time period has elapsed since the competition game space is built. The game program is further configured to compare the game points associated with the respective plurality of users to select a winner from the plurality of users.

According to this item, the winner of a competition game is determined based on the game point given to each user when the user arranges the game object in the competition game space. With this configuration, the winner can be determined based on, for example, a city-building element itself within a game, which can enhance game enjoyment in the city-building element.

(Item 2)

A gaming system according to Item 1, in which the game program is further configured to cause the computer to arrange a first object and a second object associated with the first user in the competition game space. The game program is further configured to cause the computer to arrange a third object associated with the second user in the competition game space. The game program is further configured to cause the computer to identify an effective range of the first object. The game program is further configured to cause the computer to determine whether or not at least a part of one of the second object and the third object is arranged within the effective range. The game program is further configured to cause the computer to update one of the game point and a predetermined game parameter, which is associated with the one of the second object and the third object arranged within the effective range.

According to this item, the game point or the predetermined game parameter associated with the game object, which is arranged within the effective range of the game object arranged in the competition game space, is updated irrespective of which user the game object is associated with. With this configuration, it is possible to enhance importance of strategic thinking in the city-building element or the like when the game object is arranged in the competition game space.

(Item 3)

A gaming system according to Item 2, in which the effective range of the first object is identified by receiving an action exerted by the first user on the first object arranged in the competition game space.

According to this item, a timing to update the game point or the predetermined game parameter associated with the game object arranged within the effective range can be controlled by the user. With this configuration, it is possible to enhance the importance of the strategic thinking in the city-building element or the like.

(Item 4)

A gaming system according to any one of Items 1 to 3, in which:

the game program is further configured to cause the computer to arrange a first object and a second object associated with the first user in the competition game space. The game program is further configured to cause the computer to arrange a third object and a fourth object associated with the second user in the competition game space. The predetermined game parameter is provided from the second object to the first object by associating the first object and the second object with each other by the fourth object.

According to this item, the game objects associated with the first user can be associated with each other by the game object associated with the second user. With this configuration, the user needs to plan his/her own game object arrangement in consideration of game object arrangement of a competing opponent, which can enhance the importance of the strategic thinking in the city-building element or the like.

(Item 5)

A gaming system according to any one of Items 1 to 4, in which the competition game space includes a first area in which the game object associated with the first user is allowed to be arranged. The game program further is further configured to cause the computer to change a size of the first area based on one of the game point and the predetermined game parameter, which is associated with the first user.

According to this item, a size of an area in which each user can arrange the game object associated with the user himself/herself changes when there is a change in the game point or the predetermined game parameter associated with the user himself/herself. With this configuration, flexibility of the game increases as the game progresses, which enhances the game enjoyment in the city-building element or the like.

(Item 6)

A gaming system according to any one of Items 1 to 5, in which the competition game space includes a first area in which the game object associated with the first user is allowed to be arranged. The competition game space further includes a second area in which the game object associated with the second user is allowed to be arranged. The game program is further configured to cause the computer to display only the first area in the competition game space in a visually recognizable manner.

According to this item, an area where another competing user can arrange the game object may be inhibited from being displayed for each user. With this configuration, there is need to conjecture a game progress status of another user, which can enhance the importance of the strategic thinking in the city-building element or the like.

(Item 7)

A gaming system according to any one of Items 1 to 6, in which the competition game space includes a first area in which the game object associated with the first user is allowed to be arranged. The competition game space further includes a second area in which the game object associated with the second user is allowed to be arranged. The game program is further configured to cause the computer to associate a second object, which is arranged in the first area and associated with the second user, with the first user in exchange for one of the game point and the predetermined game parameter, which is associated with the first user.

According to this item, the game object possessed by another competing user can be acquired (so-called "purchased") in exchange for the game point or the predetermined game parameter. With this configuration, it is possible to enhance the importance of the strategic thinking in the city-building element or the like.

(Item 8)

A gaming system according to Item 7, in which a value of one of the game point and the predetermined game parameter, which is necessary to associate the second object with the first user, is determined based on a utilization degree being a degree of an influence exerted on another object by the second object.

According to this item, it is difficult to purchase the game object being frequently utilized in the competition game space. With this configuration, it is possible to prevent an irrational change in a game situation (competition situation) due to the purchase of the game object, which enhances the game enjoyment in the city-building element or the like.

(Item 9)

A gaming system according to any one of Items 1 to 8, in which the game program is further configured to cause the computer to build a home game space in which only the game object associated with the first user is to be arranged. The home game space displayed on the computer is allowed to be switched to the competition game space based on an action exerted by the first user.

According to this item, the user can easily enjoy the competition game by switching the displayed home game space to the competition game space.

(Item 10)

A gaming system according to Item 9, in which the game program is further configured to cause the computer to execute a step of selecting the game object allowed to be arranged in the competition game space from among a plurality of the game objects associated with the first user, in the home game space based on the action exerted by the first user.

According to this item, the user can use the game object, which has been raised in the home game space, in the competition game space. With this configuration, the game enjoyment in the city-building element or the like are enhanced.

(Item 11)

A gaming system according to Item 10, in which the game object arranged within a predetermined range including a predetermined one of the game objects arranged in the home game space is selected as the game object allowed to be arranged in the competition game space. The game object arranged within the predetermined range is reflected in the competition game space under a state in which an arrangement positional relationship of the game object is maintained.

According to this item, the user can define, in the home game space, initial arrangement of the game object within the competition game space. With this configuration, the user can eliminate time and labor to rearrange the game object for every competition game, and can easily enjoy the competition game.

(Item 12)

A gaming system according to Item 10 or 11, in which, after a transfer time period shorter than the competition time period has elapsed in the competition game space, a predetermined number of the game objects, which are selected at random from among the game objects selected in the home game space so as to be arranged in the competition game space, are allowed to be arranged in the competition game space.

According to this item, a larger number of game objects brought in from the home game space by the user can be used as the competition game progresses, which enhances the game enjoyment in the city-building element or the like.

(Item 13)

A gaming system according to any one of Items 10 to 12, in which, before measurement of the competition time period is started, a predetermined number of the game objects, which are selected from among the game objects selected in the home game space so as to be arranged in the competition game space, are allowed to be arranged in the competition game space.

According to this item, an arrangement position of the game object brought in from the home game space by the user can be determined before the competition is started. With this configuration, the user does not need to hurry to determine the arrangement position of the game object when the competition is started, and can therefore easily enjoy the competition game.

(Item 14)

A gaming system according to any one of Items 10 to 13, in which the game point obtained by arranging the game object in the home game space and the game point obtained by arranging the game object in the competition game space are the same for the game object selected in the home game space so as to be arranged in the competition game space.

According to this item, in at least one embodiment the game point that is acquired by arranging the game object brought in from the home game space by the user in the competition game space be set equal to the game point that can be acquired by arranging the game object in the home game space. With this configuration, the user can advantageously advance the competition game by raising the game object in the home game space, which enhances the game enjoyment in the city-building element or the like that allows the switching between a plurality of game spaces.

(Item 15)

A gaming system according to any one of Items 10 to 14, in which the game object has a first status that inhibits the action exerted by the first user from being received and a second status that allows the action exerted by the first user to be received. A first object in the first status is set to change to the second status after one of a building time period and a preparation time period has elapsed. One of the building time period and the preparation time period within the home game space and one of the building time period and the preparation time period within the competition game space are different.

According to this item, speediness of a game progress can be made different between in the competition game space and in the home game space, and hence the user can easily enjoy the competition game.

(Item 16)

A gaming system according to Item 15, in which the competition time period is selectable from a plurality of the competition time periods different in duration. A duration of one of the building time period and the preparation time period is set based on the duration of the competition time period.

According to this item, the speediness of the game progress within the competition game space can be made different depending on the competition time period, and hence the user can easily enjoy the competition game.

(Item 17)

A gaming system according to any one of Items 9 to 16, in which the predetermined game parameter associated with the first user in the home game space is different from the predetermined game parameter associated with the first user in the competition game space.

According to this item, the user is not allowed to bring a part of the game parameter, e.g., an in-game currency, which has been acquired in the home game space, into the competition game space, and needs to newly acquire the game parameter in the competition game space. With this configuration, a game progress degree of the user within the home game space can be inhibited from being excessively influenced in the competition game space, which enhances the game enjoyment in the competition game.

(Item 18)

A gaming system according to any one of Items 9 to 16, in which the predetermined game parameter associated with the first user in the home game space is the same as the predetermined game parameter associated with the first user in the competition game space.

According to this item, the user is allowed to use a part of the game parameter, e.g., an item, which has been acquired in the home game space by payment of a charge, also in the competition game space. With this configuration, the game enjoyment in the competition game are enhanced.

Specific examples of a gaming system including a game program for execution by a computer according to at least one embodiment of this disclosure are described below with reference to the drawings. The disclosure is not limited to those examples, and is defined by the appended claims. This disclosure includes modifications within the appended claims and the equivalents thereof. In the following description, like elements are denoted by like reference symbols in the description of the drawings, and redundant description thereof is omitted.

A game system 1 according to at least one embodiment illustrated in FIG. 1 provides a city-building simulation game to a plurality of users. The game system 1 includes a plurality of user terminals 100-1 to 100-4 and a game server 200. The respective user terminals 100 and the game server 200 are connected to one another through a network 2. The game server 200 provides various services relating to a game to the respective user terminals 100. The network 2 may include the Internet and a wireless network (for example, Wi-Fi (trademark)) built by wireless base stations (not shown).

Figure 2:
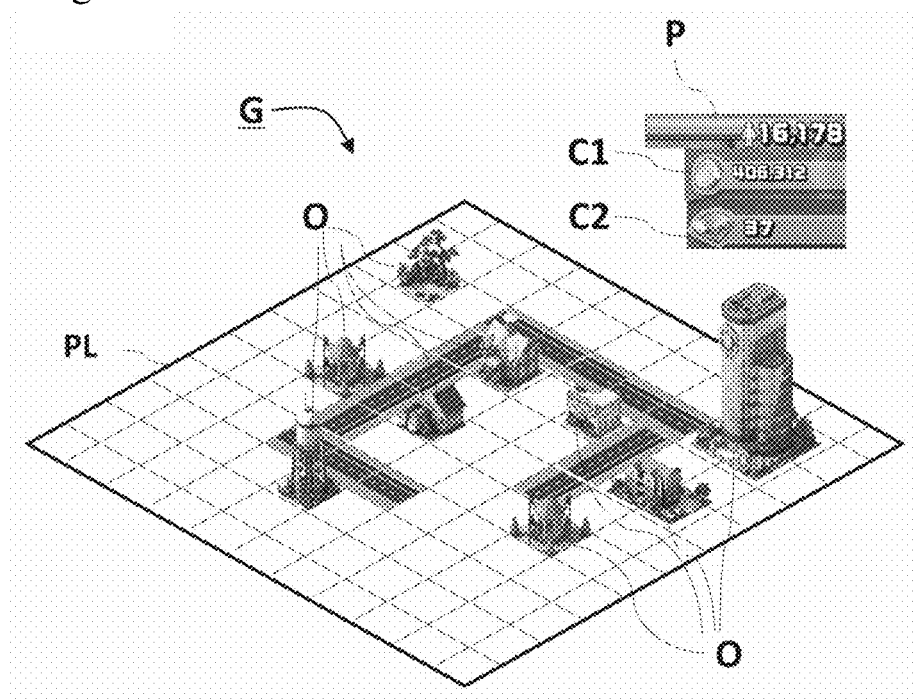
FIG. 2 is a diagram for illustrating a game space according to at least one embodiment.

The user advances the game by arranging various objects O in a plane PL within a virtual game space G illustrated in, for example, FIG. 2. The game space G includes, for example, a plane formed of a plurality of grid cells and a background representing a sky, a distant view, or the like. In at least one embodiment, each of the plurality of objects O is arranged in one or more of the grid cells. The number of grid cells necessary to arrange the object is determined for each building. Each user can acquire a game point by arranging the object O in the game space G. The game point includes, for example, a "population" P associated with each object. The user possesses game parameters including various in-game items in addition to a "coin" C1 and a "diamond" C2 as in-game currencies.

Figure 3:
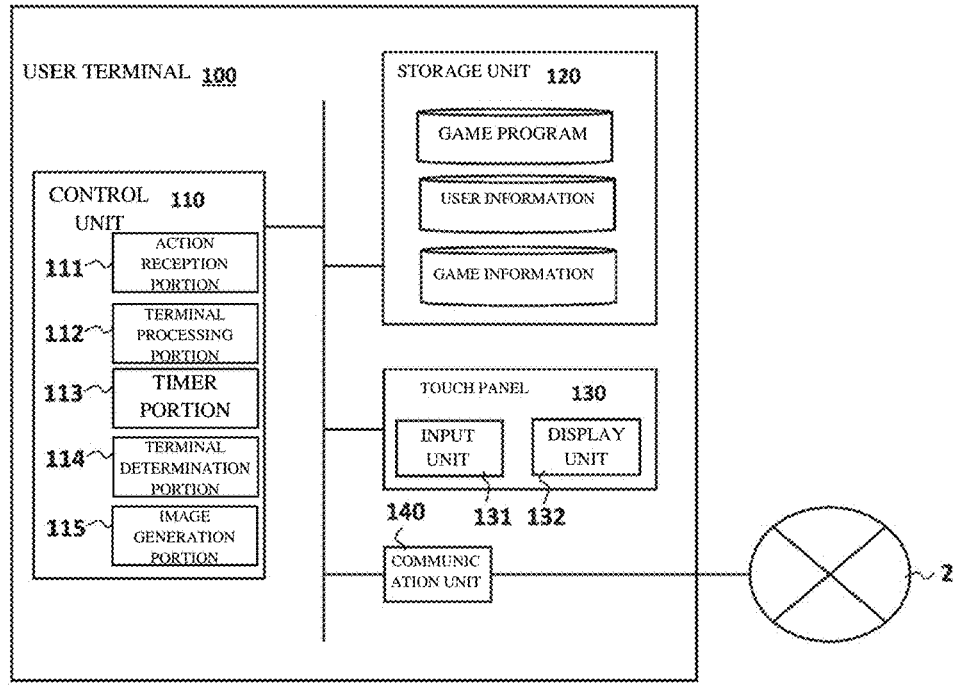
FIG. 3 is a diagram for illustrating a configuration of a user terminal according to at least one embodiment.

FIG. 3 is an illustration of a configuration of each of the user terminals 100. In at least one embodiment, the user terminal 100 is a mobile terminal, e.g., a smartphone, a feature phone, a PDA, or a tablet computer. The user terminal 100 includes a control unit 110, a storage unit 120, an input unit 131, a display unit 132, and a communication unit 140 that are connected to one another through a bus. In at least one embodiment, the user terminal 100 includes a touch panel 130 including the input unit 131 and the display unit 132, and the user can operate a game object within the game space G through the touch panel 130. The input unit 131 detects an operation conducted for the touch panel 130 by the user, and detects that there is some operation (mainly, physical contact operation, e.g., touch operation, slide operation, swipe operation, or tap operation) conducted for the user terminal 100. The touch panel 130 may be formed of a liquid crystal display or the like including a touch sensing unit.

The communication unit 140 is configured to conduct control for executing transmission and reception of various kinds of information to/from the game server 200. In at least one embodiment, the control includes an operation instruction to transmit a predetermined game program and game data to the user terminal 100 and an instruction for advancing the game. For example, the communication unit 140 transmits a user ID to the game server 200, to thereby receive information (including object information on the possessed building or the like) relating to the game object associated with the user ID. When the game object is arranged in the game space G based on the user's operation, the communication unit 140 transmits the game point acquired as a result of the arrangement to the game server 200.

The control unit 110 may be formed of a central processing unit (CPU) or the like. The communication unit 140 establishes a connection between the user terminal 100 and the network 2 under control of the control unit 110. The storage unit 120 includes a main memory formed of a dynamic random access memory (DRAM) or other such volatile storage device and an auxiliary memory formed of a flash memory, a hard disk drive (HDD), or other such nonvolatile storage device. The auxiliary memory stores the game program and the like downloaded from the game server 200. The program is loaded on the main memory and executed by the control unit 110. The control unit 110 of the user terminal 100 can be caused by the program to function as an action reception portion 111, a terminal processing portion 112, a timer portion 113, a terminal determination portion 114, and an image generation portion 115. The main memory also temporarily stores data generated while the control unit 110 is operating in accordance with the program and data to be used by the control unit 110.

The action reception portion 111 is configured to detect an action exerted on the input unit 131 by the user. The action reception portion 111 discriminates what kind of input has been conducted, e.g., whether or not an operation instruction has been issued through the touch panel 130 or other such button, and outputs a result of the discrimination to a necessary component, e.g., the terminal processing portion 112. When an operation input is conducted for the touch panel 130, the action reception portion 111 detects coordinate information on a position of the operation input and what kind of operation, e.g., a touch operation or a slide action, has been conducted. The action reception portion 111 can also detect that the user's contact has been released from the touch panel 130 by detecting that continuous detection of the input has stopped.

The terminal processing portion 112 is configured to control an operation of the entire user terminal 100 to transmit and receive data among the respective components and to conduct arithmetic operation processing necessary to execute a game. For example, the terminal processing portion 112 causes the game being executed in accordance with the game program to develop based on the operation input detected by the action reception portion 111, and instructs the image generation portion 115 to draw a game image as a result of the development. For example, the terminal processing portion 112 operates the game object within a virtual space based on the operation input conducted for the touch panel 130. The terminal processing portion 112 may conduct processing for controlling a position of a virtual camera configured to specify a visual field of the game space G depending on a progress status of the game.

The timer portion 113 is configured to measure a lapse of time within the game space G. The timer portion 113 has a function of measuring time individually for each object O arranged in the game space G. For example, as described later, the timer portion 113 causes the storage unit 120 to store a time at which each object O is arranged in the game space G, and measures a time period that has elapsed after the arrangement, to thereby provide the terminal determination portion 114 with time information to be used for determining whether or not the following time periods has elapsed: a building time period before each object O changes from an under-construction object to a completed object; a preparation time period after each object O changes to the completed object before each object O becomes ready to acquire various game points; and a cooldown time, which is a time period before each object O becomes ready to activate a skill. The timer portion 113 may be configured to measure a competition time period described later.

The terminal determination portion 114 is configured to execute various kinds of determination necessary for the game progress by referring to various kinds of user information and game information stored in a storage unit based on a determination request received from the terminal processing portion 112. For example, the terminal determination portion 114 determines whether or not the object O arranged in the game space G satisfies a predetermined condition. As described later, the terminal determination portion 114 refers to the timer portion 113 and the storage unit 120 to acquire the time information on the object, and to determine whether or not a basic condition for calculating the game point to be given to the user, which is set for each object, is satisfied.

The image generation portion 115 is configured to generate images including the game space G and the game object O, which are to be displayed on the display unit 132, based on the user information received from the game server 200, arithmetic operation results obtained by the game program, and the operation input conducted for the input unit 131 by the user. In at least one embodiment, the user terminal 100 generates the image of the game space G by acquiring, from the game server 200, information relating to a type or an arrangement position of an object arranged in the game space G by the user. The image generation portion 115 is further configured to update the display image depending on the game progress controlled by the terminal processing portion 112.

Figure 4:
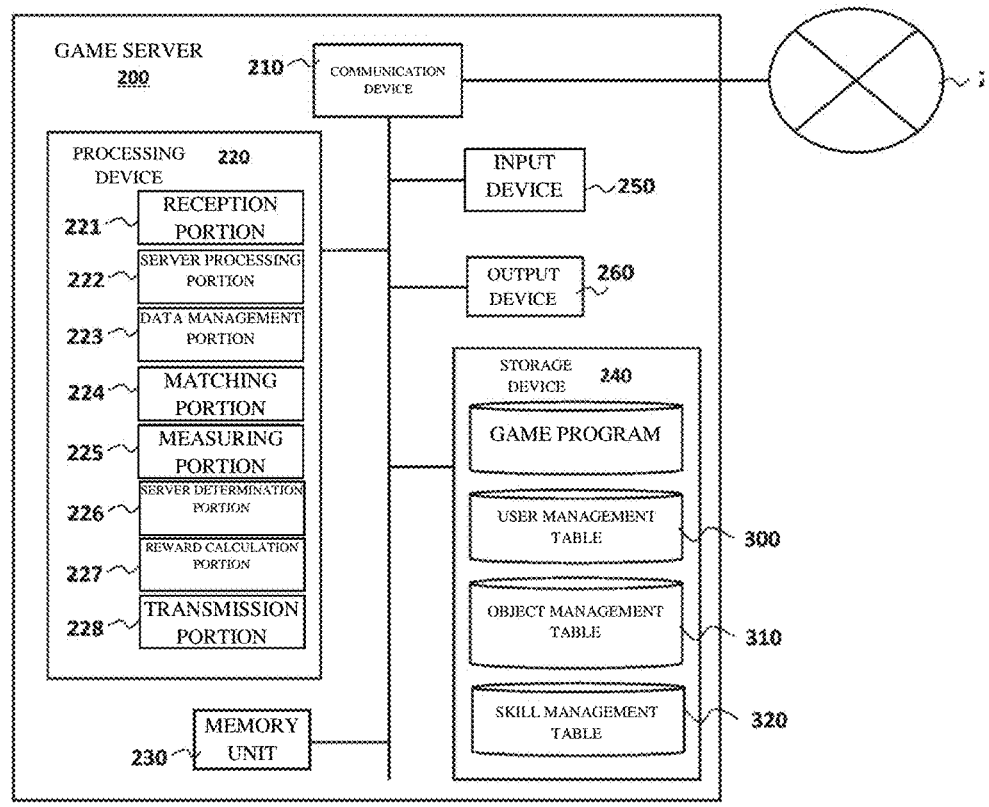
FIG. 4 is a diagram for illustrating a configuration of a game server according to at least one embodiment.

FIG. 4 is an illustration of a configuration of the game server 200. The game server 200 is an information processing device to be used when a system administrator or the like controls and manages a game to be provided to a user (game player), and is, for example, a workstation or a personal computer. The game server 200 according to this embodiment has a game providing function for providing information necessary for the game progress to each user terminal. The game server 200 receives various operation instructions from the user terminal 100, and transmits a game program that can run on the user terminal 100, a web page (e.g., game screen), various kinds of data including game parameters, various notifications, and the like. The game server 200 includes a communication device 210 serving as a network interface configured to communicate to/from the network 2, a processing device 220, a memory unit 230, a storage device 240, an input device 250, and an output device 260, which are electrically connected to one another through a bus.

The processing device 220 is configured to control an operation of the entire game server 200 to transmit and receive data among the respective components and to conduct arithmetic operation processing necessary to execute a game. The processing device 220 is, for example, a CPU, and executes the program or the like stored in the storage device 240 and loaded on the memory 230, to thereby achieve necessary processing. The processing device 220 can be caused by the program to function as a reception portion 221, a server processing portion 222, a data management portion 223, a matching portion 224, a measuring portion 225, a server determination portion 226, a reward calculation portion 227, and a transmission portion 228.

The memory unit 230 is, for example, a DRAM or other such volatile storage device, and the storage device 240 is, for example, a flash memory, an HDD, or other such nonvolatile storage device. The main memory also temporarily stores data generated while the control unit 110 is operating in accordance with the program and data to be used by the control unit 110. In the storage device 240, the game program and an authentication program for a user are stored, and as described later, databases including a user management table 300, an object management table 310, and a skill management table 320 are also built.

The reception portion 221 is configured to receive various kinds of information from each user terminal 100. Each user terminal 100 transmits various kinds of information to the game server 200 under control of the communication unit 140, and the game server 200 receives the information through the network 2 and the communication device 210 to identify and receive content of the information using the reception portion 221. The reception portion 221 refers to various management tables stored in the storage device 240 to execute necessary processing while the data management portion 223 updates various management tables as necessary. The information includes various requests including an operation for arranging an object associated with each user in a game space, an operation for deleting the object, an operation for moving the object, an operation for buying and selling the object in a shop, and an operation for purchasing the object from another user.

The server processing portion 222 is configured to control the operation of the entire game server 200 to transmit and receive the data among the respective components and to conduct the arithmetic operation processing necessary to execute the game. Further, the data management portion 223 is configured to update various databases stored in the storage device 240 based on various arithmetic operation results obtained by the server processing portion 222. For example, when the user exerts an action on the user terminal 100 so as to arrange the object O in the game space G, the reception portion 221 receives, as a result of the action, the object information on the object possessed by the user and information relating to the game point, and the server processing portion 222 executes necessary processing, while the data management portion 223 updates the user management table 300 based on the data.

When receiving a request to arrange an object in the game space G from the user terminal 100, the data management portion 223 stores the information on the object arranged in the game space G in association with information relating to the user information and the arrangement position of the object. As described later, when there is a change in the game point relating to each user and each object, the data management portion 223 updates various databases so as to associate information relating to a result of the change with each object.

The matching portion 224 is configured to conduct a series of processing for matching a plurality of users and starting the competition game. When a given user inputs a request to start a competition game in a home game space described later, the matching portion 224 generates a lobby, and identifies the given user as a matching standby user. When the number of matching standby users identified in the lobby reaches a predetermined number, the matching portion 224 builds the competition game space for the users, and causes the server processing portion 222 to execute the processing for starting the competition game.

The measuring portion 225 is configured to mainly manage a competition time period during a competition game. As described later, the measuring portion 225 starts measuring the competition time period when receiving a request for the processing for starting the competition game from the matching portion 224, and centrally manages the competition time period to be shared by the plurality of users. The measuring portion 225 further measures time information within the game space G, and compares the measured time information with time information within the game space G measured by the timer portion 113. This synchronizes the time information within the game space G between the user terminal 100 and the game server 200, which allows the measurement and determination of various kinds of time information to be smoothly carried out.

The server determination portion 226 refers to various kinds of user information and game information stored in the storage device 240 based on a determination request received from the server processing portion 222 to execute various kinds of determination necessary for the game progress. Further, the server determination portion 226 refers to the game points possessed by the respective users when the competition game is ended to determine a win-loss outcome of the competition. In at least one embodiment, the win-loss outcome is determined based on the game point, e.g., the population P described above. A predetermined game parameter associated with the user, e.g., the coin C1, and other elements including an occupancy rate of the game space G may be taken into consideration as well.

The reward calculation portion 227 is configured to calculate a reward to be provided to each user based on a determination result of the win-loss outcome obtained by the server determination portion 226. The reward calculation portion 227 may also refer to information on ranks of the respective users in the competition game to distribute rewards corresponding to ranks to the respective users.

The transmission portion 226 is configured to conduct control for transmitting the game program that can run on the user terminal 100, game space information including the game screen, various kinds of data including the game point, the game parameter, and the reward, various notifications, and the like to the user terminal 100.

The input device 250 is an information input device, e.g., a mouse or a keyboard. The output device 260 is a liquid crystal display or the like, and is used for monitoring information on a computer.

At least apart of the above-mentioned functions of the user terminal 100 may be included in the game server 200. Further, at least a part of the above-mentioned functions of the game server 200 may be included in the user terminal 100. That is, the computer for executing the game program according to at least one embodiment may be selected from, for example, information processing devices including the user terminal 100 and the game server 200 described above.

In FIG. 5, there is shown an example of the user management table 300 for managing the user information including the game point, the game parameter, and the object that are possessed by each user. The user management table 300 is stored in at least one of the storage device 240 of the game server 200 and the storage unit 120 of the user terminal 100. In the user management table 300, the user information for identifying each user, the game parameters possessed by each user, e.g., a coin, an item, and a diamond, and the object information on a building or the like possessed by each user are associated with one another. Basic information relating to each object is managed by the object management table 310 described later. In the user management table 300, a level of each object, a parameter correction value for each building based on the level, and the arrangement position of the building within the game space G are managed. As described later, a status of the building indicating that each object is under construction or has been completed is also managed along with an elapsed time period after the object is arranged in the game space G or an elapsed time period that has elapsed since the object is completed. In addition, a possessed population is managed as the game point associated with each object, and a total value of the possessed populations of the respective objects is managed as the game point associated with the user of interest.

In FIG. 6, there is shown an example of the object management table 310 for managing information associated with each object. In at least one embodiment, the type of the object and information relating to the game point and the game parameter that can be acquired, e.g., the possessed population and the coins and items to be produced, are defined for each object. In order to allow the game point and the game parameter to be acquired from each object, the object needs to be brought into operation, and a power consumption amount is defined as a game parameter necessary for the operation. The time periods that are set include the building time period that needs to be taken after each object is arranged in the game space G as an under-construction building before the object changes to a completed building and the preparation time period that is necessary for each object to produce the coins and items. A plurality of preparation time periods may be defined, and production amounts of the coins and items may be set to increase each time the preparation time period elapses.

In FIG. 7 and FIG. 8, there are shown examples of the skill management table 320 and a skill management table 330 for managing skills associated with each object. An object having a passive skill shown in FIG. 7 can activate a predetermined skill (passive skill) for advantageously advancing the game by changing to the completed building after having been arranged in the game space G. A detail of the skill and an effective range within which an influence of the skill is exerted are defined for each object, and an effect of the skill is automatically given to an object arranged within the effective range. Each object capable of activating an active skill shown in FIG. 8 (hereinafter sometimes referred to as "skill object") can activate a predetermined skill for advantageously advancing the game by changing to the completed building after having been arranged in the game space G and by receiving a request to activate the skill from the user. A detail of the skill, an effective range within which an influence of the skill is exerted, and a cooldown time of the skill are set for each object. Each object enters a cooldown time when the object is changed to the completed object or once the object uses the skill, and is not allowed to activate the skill within a predetermined time period.

Now, a flow of processing of the game system 1 according to at least one embodiment is described in detail with reference to FIG. 9 to FIG. 31. The user can arrange each object in the game space by selecting an object to be arranged (so-called "built") in the game space G from an object list (not shown) and specifying a location. As described above, the user can acquire the population, the coins (in-game currency), and various items as the game points by arranging each object in the game space. The user can also move the arrangement position of the object by selecting the object that has already been arranged and specifying another location.

Figure 9:
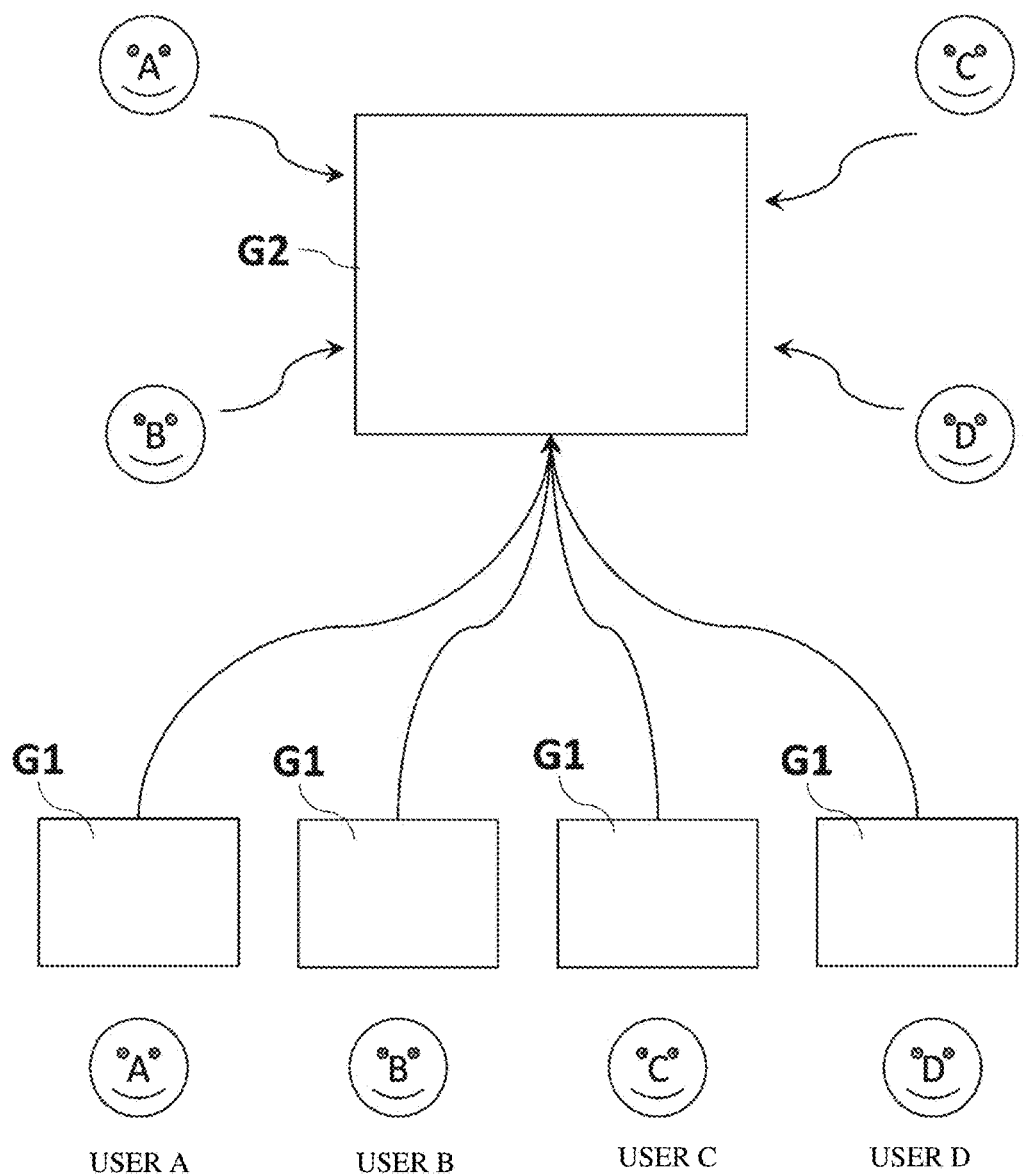
FIG. 9 is a diagram for illustrating a relationship between a home game space and a competition game space.

As illustrated in FIG. 9, the game space G according to at least one embodiment includes a home game space G1 and a competition game space G2. The home game space G1 is associated with each of users A to D, and is a game space in which only the user associated with the home game space G1 can arrange the game object. The competition game space G2 is a game space to be shared by the plurality of users A to D through a network, and the plurality of users A to D can arrange the game objects associated with themselves in the competition game space G2. Each of the users A to D can switch the home game space G1 and the competition game space G2 to be displayed on each user terminal 100 by a predetermined user action.

In at least one embodiment, the population or other such in-game information for determining the win-loss outcome of the competition is defined as the game point. The information defined as the game parameters includes: the in-game information that is associated with a predetermined user or a predetermined game object and is necessary to advance the game advantageously, e.g., the coins and various items; and the in-game information that is associated with each game object and is necessary to bring the game object into operation (for example, information including the power consumption and the occurrence of a fire, which are described later). The game points and the game parameters may partially overlap with each other, and at least a part of the game parameters may be referred to in determining the win-loss outcome of the competition based on the game point.

Figure 12:
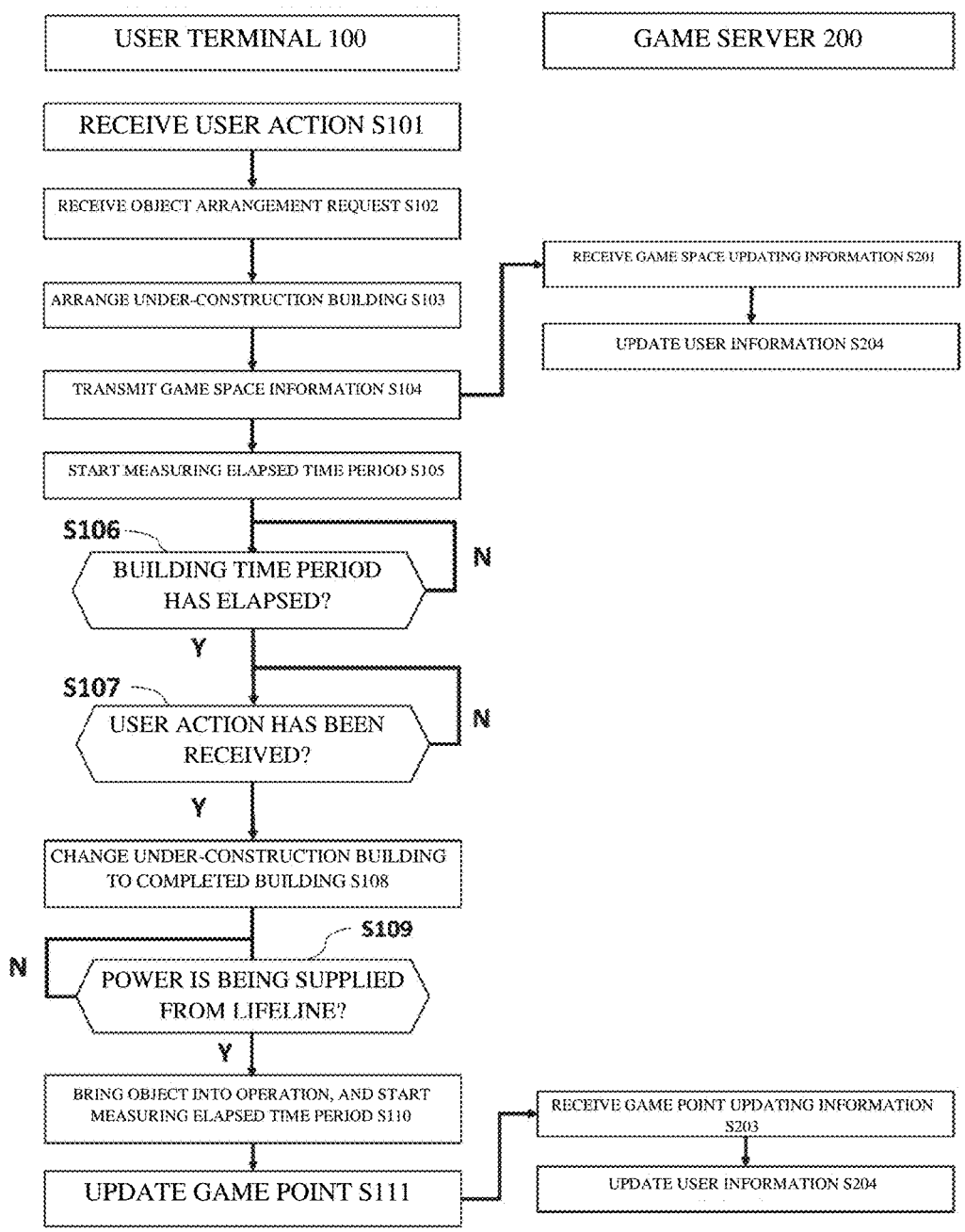
FIG. 12 is a flowchart for illustrating processing conducted by the game system according to at least one embodiment.
Figure 13:
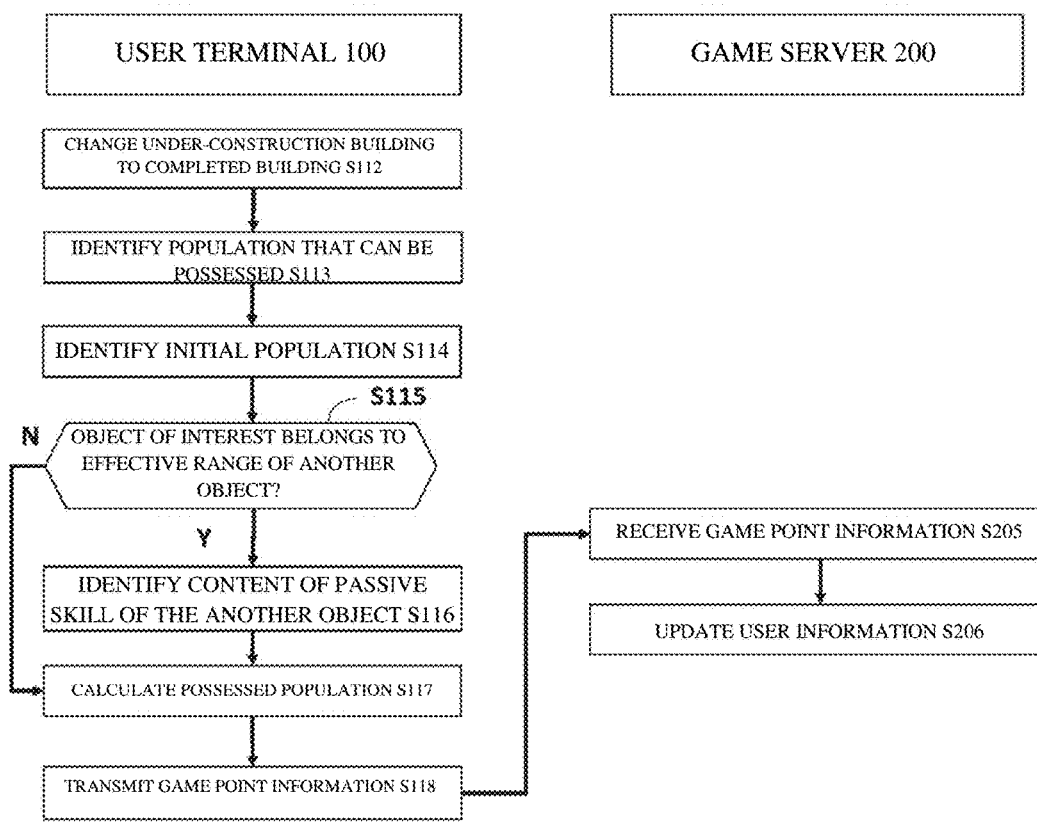
FIG. 13 is a flowchart for illustrating processing conducted by the game system according to at least one embodiment.
Figure 14:
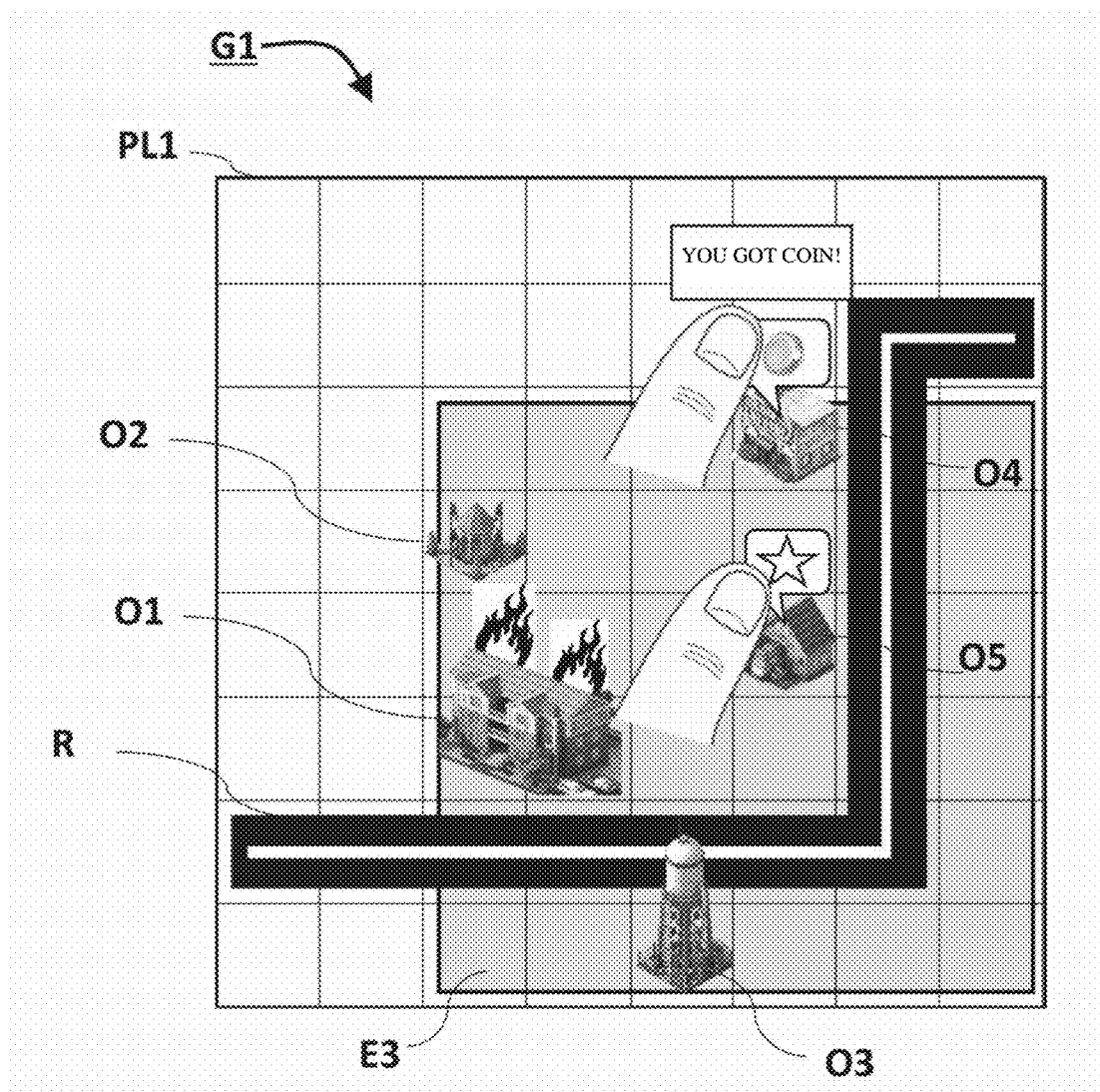
FIG. 14 is a diagram for illustrating at least one example of the home game space.
Figure 15:
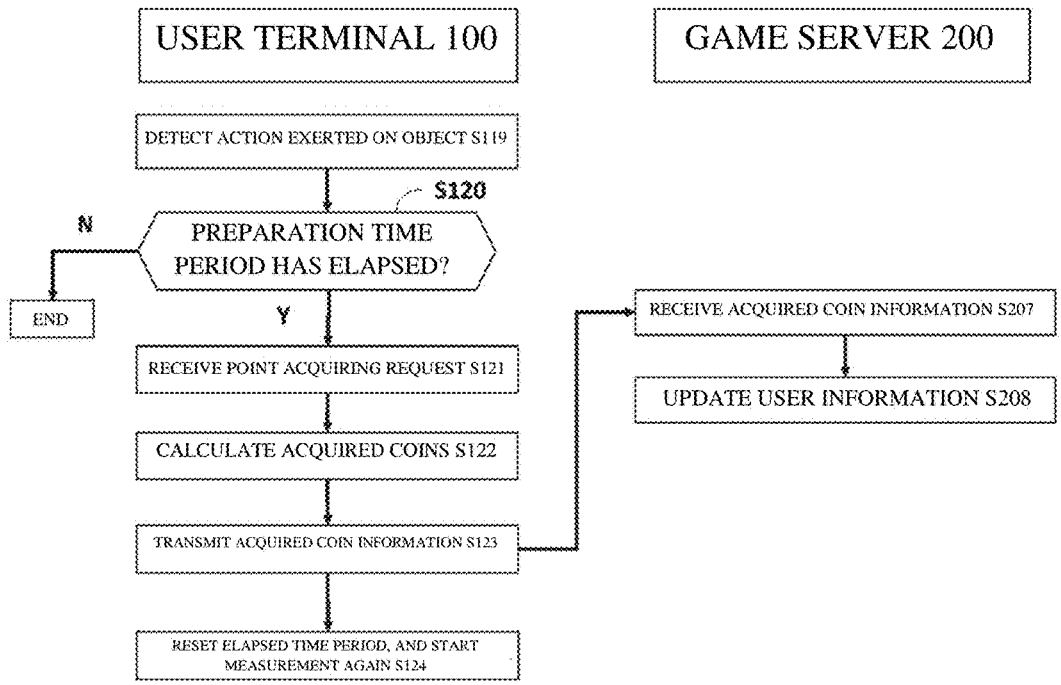
FIG. 15 is a flowchart for illustrating processing conducted by the game system according to at least one embodiment.
Figure 16:
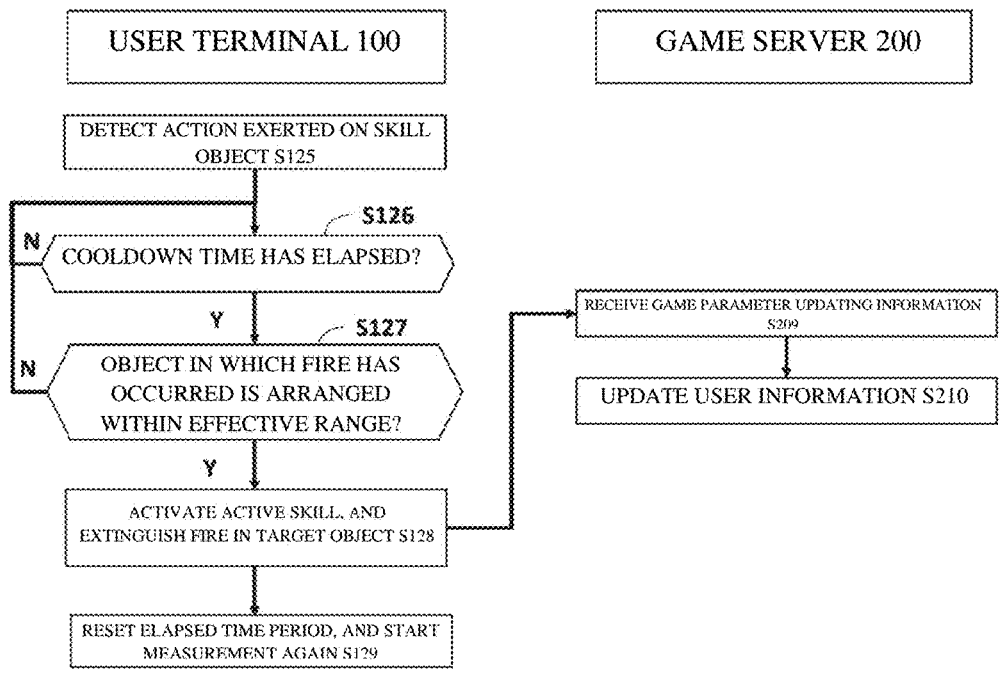
FIG. 16 is a flowchart for illustrating processing conducted by the game system according to at least one embodiment.
Figure 17:
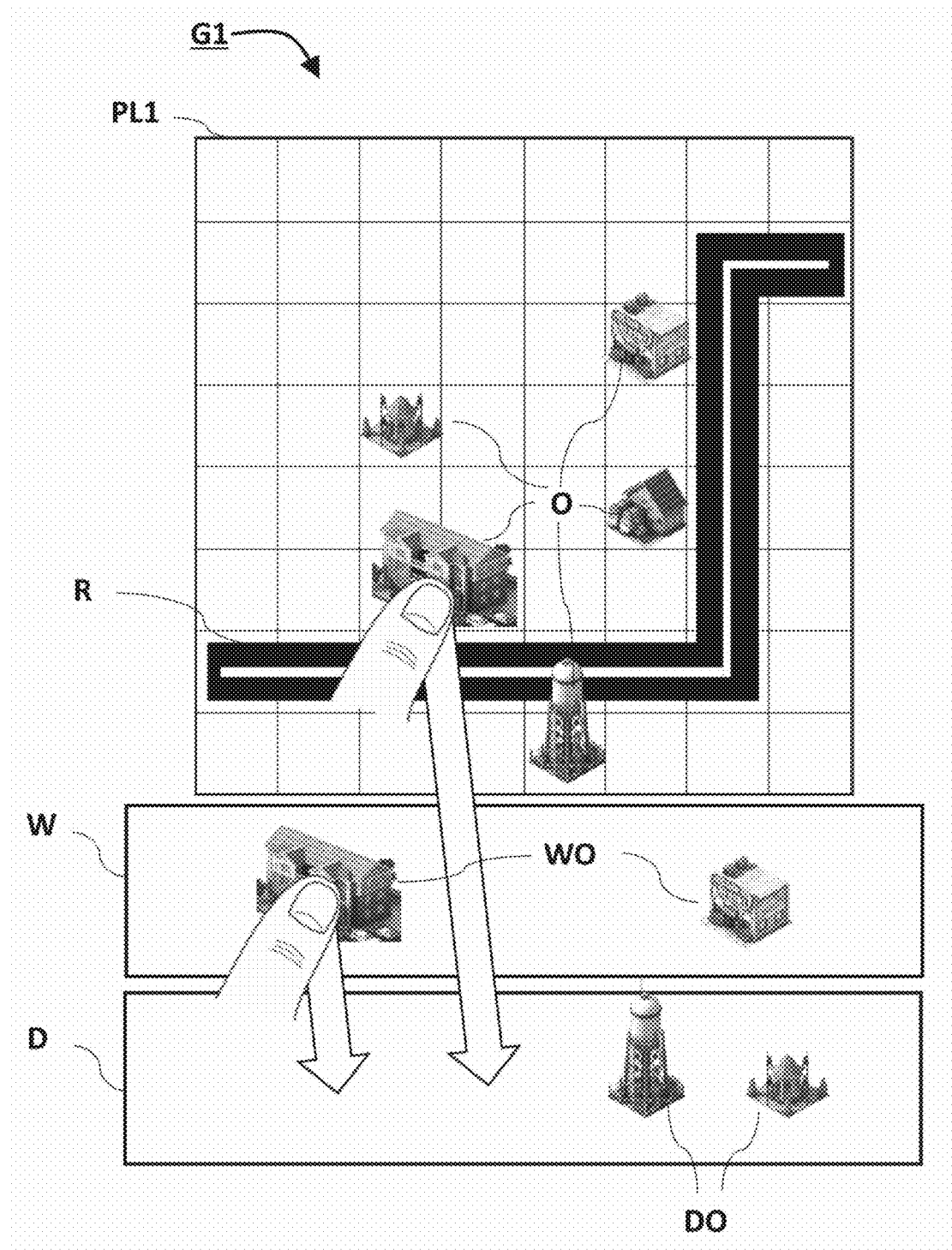
FIG. 17 is a diagram for illustrating at least one example of the home game space.
Figure 18:
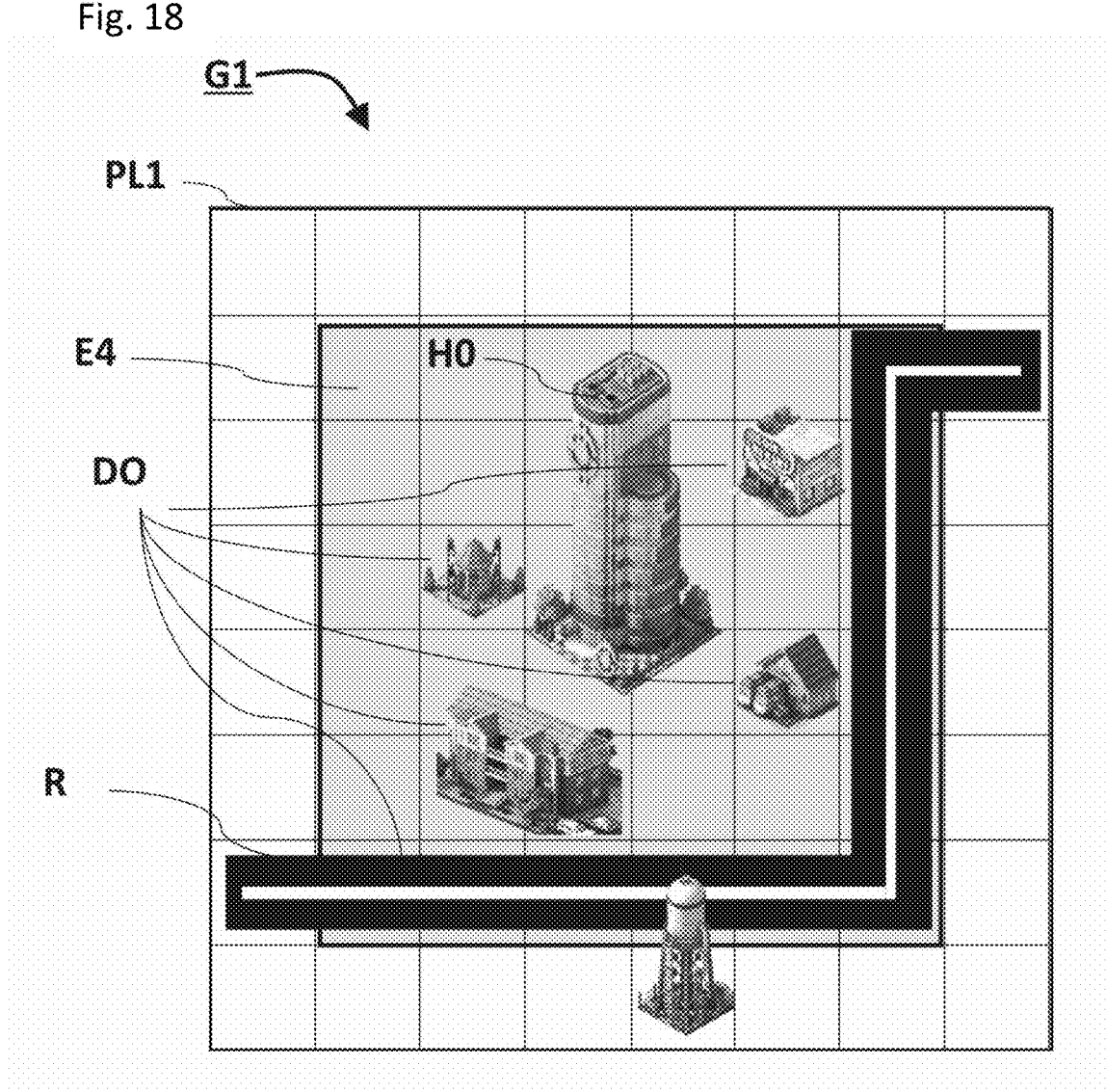
FIG. 18 is a diagram for illustrating at least one example of the home game space.

With reference to FIG. 10 to FIG. 18, a flow of game progress processing within the home game space G1 is described in detail. With reference to FIG. 10 to FIG. 13, processing for giving a game point to a user based on the arranging of a game object in the home game space G1 as a building is described. With reference to FIG. 14 to FIG. 16, processing for giving a game parameter to a user based on a user action exerted on a building arranged in the home game space G1 is described. With reference to FIG. 17 and FIG. 18, processing for enabling a building within the home game space G1 to be used in the competition game space G2 is described. FIG. 12, FIG. 13, FIG. 15, and FIG. 16 are flowcharts for illustrating processing of a game system for causing the computer to execute those functions. In FIG. 10, FIG. 11, FIG. 14, FIG. 17, and FIG. 18, examples of the home game space G1 are illustrated.

Figure 10:
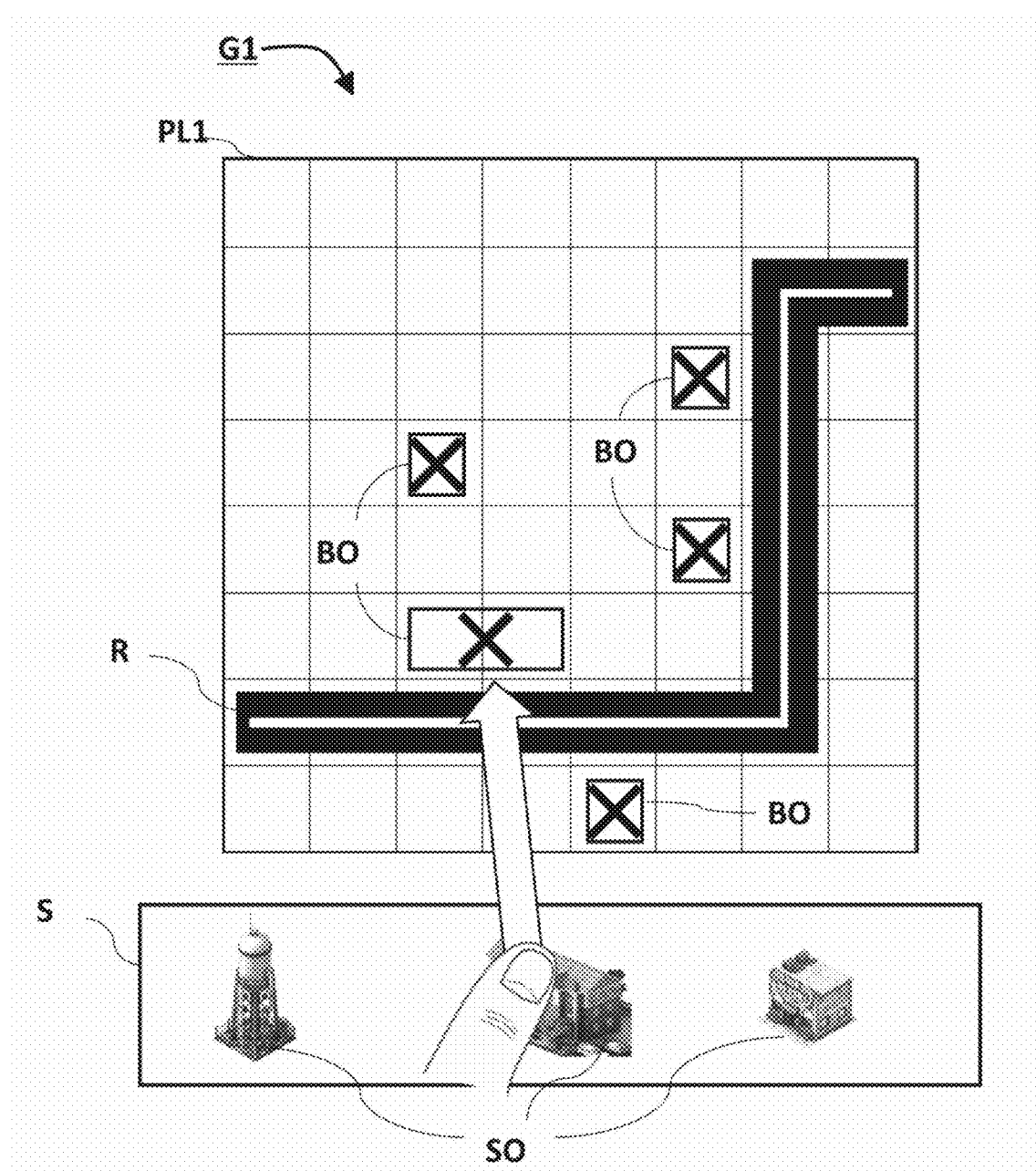
FIG. 10 is a diagram for illustrating at least one example of the home game space.

As illustrated in FIG. 10 and FIG. 12, a predetermined object is selected by long press from among shop objects SO included in a shop S displayed on the user terminal 100, and is dragged to a predetermined position in a plane PL1 within the home game space G1. With this operation, the action reception portion 111 detects an action exerted on the input unit 131 from the user (S101), and receives the action as an object arrangement request for arranging an object in the game space (S102). In the plane PL1, an under-construction building BO (in a first status) is arranged based on the object arrangement request (S103). Then, the user terminal 100 transmits game space information indicating that the object has been arranged in the game space G to the game server 200 (S104). The game server 200 receives the information relating to the object arranged by the user (S201), and updates the user management table 300 based on the information (S202).

Figure 11:
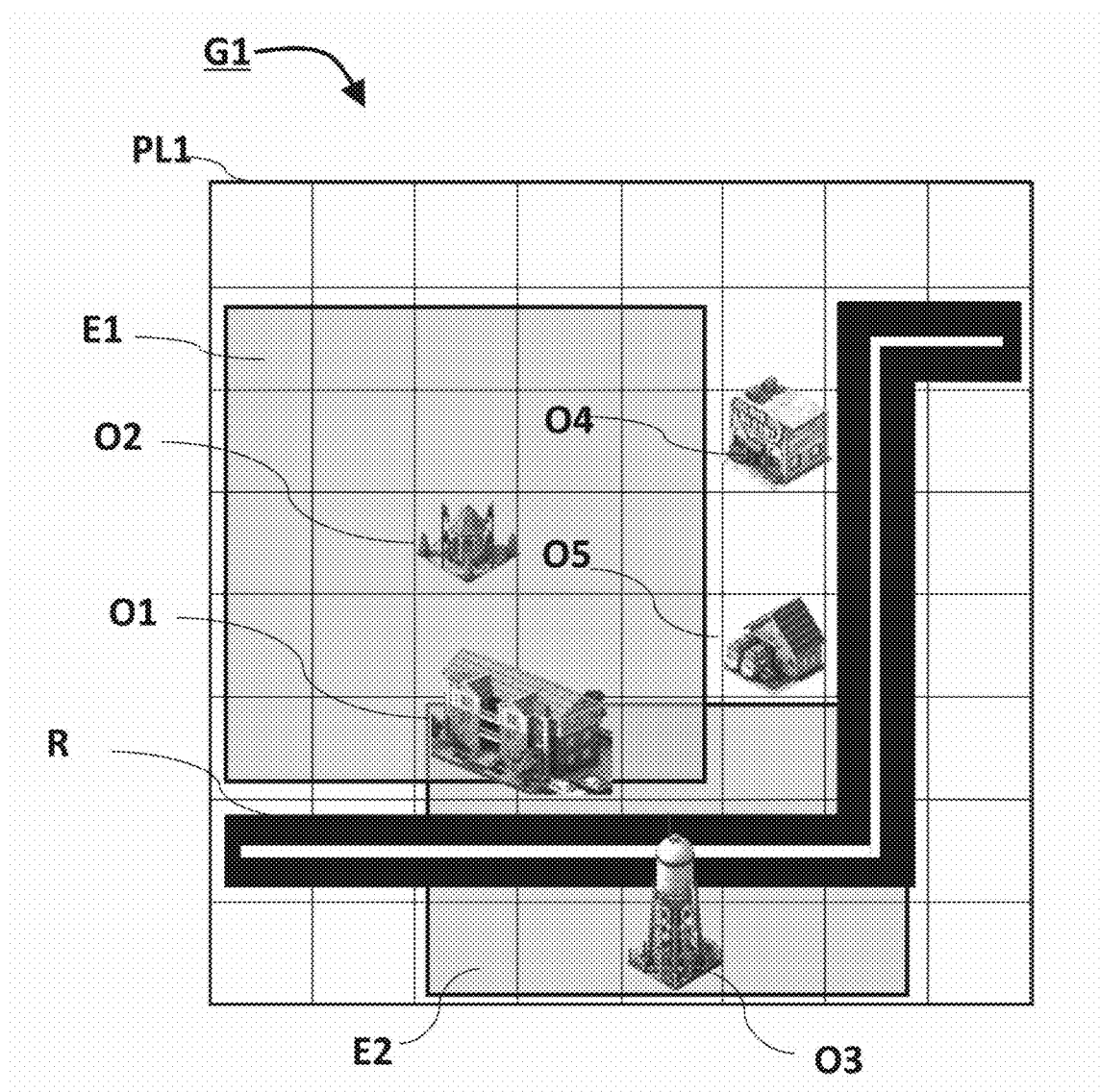
FIG. 11 is a diagram for illustrating at least one example of the home game space.

When the under-construction building BO is arranged in the plane PL1, the timer portion 113 starts measuring an elapsed time period (S105). When the elapsed time period of the under-construction building exceeds the building time period set for each object (S106), and when a user action (for example, tap operation) exerted on the under-construction object BO is further received (S107), the under-construction building BO changes to each of completed buildings O1 to O5 (S108). Subsequently, the user terminal 100 determines whether or not the power is being supplied from a lifeline to the completed object (S109), and brings each object into operation (S110). As illustrated in FIG. 11, a power plant O3 being a lifeline is arranged adjacently to a road R, and hence power is supplied to an object adjacent to the road R. In this embodiment, an apartment building O1, a store O4, and a fire station O5 are brought into operation by power supplied from the power plant O3, while a park O2 needs no power and is therefore brought into operation without the need to be adjacent to the road R.

When the completed building is brought into operation, the user terminal 100 starts receiving a user action exerted on the object, and as described later, the processing is conducted so that the user terminal 100 becomes ready to receive the acquisition of the game parameter based on the object and the activation of a skill (in a second status). When the under-construction building changes to the completed building, the timer portion 113 starts measuring the elapsed time period of each of the objects O1 to O5 (S110). Then, the game point (for example, population P) associated with the object, which has been acquired by arranging the object in the game space G, is given to the user, and the game point associated with the user is updated (S111). At this time, the user terminal 100 transmits, to the game server 200, the game information including the information indicating that the under-construction building has changed to the completed building, and the game server 200 receives the information indicating that the object possessed by the user has changed to the completed building and the information relating to the game point acquired by bringing the completed building into operation (S203), and updates the user management table 300 based on the information (S204).

The completed building may be changed to the under-construction building again. For example, the population that can be possessed and the production amount of the coins may be increased based on the extension or upgrade of the completed building. In this case, the completed building is changed to the under-construction building again to start measuring the elapsed time period (in the same manner as in Step S105), and a user action starts being received again after the building time period (extension work time) necessary for the extension or upgrade has elapsed (in the same manner as in Steps S106 and S107). In this manner, the under-construction building may be changed to a completed building subjected to the extension or upgrade (in the same manner as in Step S108). The above-mentioned processing steps of Steps S109 to S111 and S203 to S204 may also be applied to the subsequent processing for updating the game point.

As illustrated in FIG. 11 and FIG. 13, when the apartment building O1, the park O2, the power plant O3, the store O4, and the fire station O5 are arranged in the plane PL1 as the completed buildings (S112), the user terminal 100 calculates the possessed population of each object (S117), to thereby calculate the game point associated with the user. In at least one embodiment, the apartment building O1 is the only object that can possess the population. First, the user terminal 100 refers to the object management table 310 to identify the population that can be possessed by the apartment building O1 (S113), and identifies an initial population allowed to be possessed by arranging the apartment building O1 in the plane PL1 (S114).

The user terminal 100 calculates a change in the population possessed by the apartment building O1, which is exhibited depending on the skill of another object. First, the user terminal 100 determines whether or not the apartment building O1 belongs to the effective range of another object (S115), and the apartment building O1 is identified to belong to an effective range E1 of the park O2 and an effective range E2 of the power plant O3. After identifying the contents of the passive skills of the park O2 and the power plant O3 (S116), the user terminal 100 calculates the possessed population of the apartment building O1 by adding a population increase amount that is based on the passive skill of the park O2 to the initial population and subtracting a population decrease amount that is based on the passive skill of the power plant O3 from the initial population (S117). The user terminal 100 transmits the possessed population obtained by arranging the apartment building O1 in the game space to the game server 200 as game point information (S118), and the game server 200 receives the information relating to the game point (S205), and updates the user management table 300 based on the information (S206).

In addition, as illustrated in FIG. 14 to FIG. 16, processing for giving a game parameter to a user based on a user action exerted on a building arranged in the plane PL1 is executed. As illustrated in FIG. 15, when the user, for example, taps the store O4 arranged in the plane PL1, the user terminal 100 detects that a user action has been input (S119). Then, the user terminal 100 refers to the elapsed time period of the store O4 within the user management table 300, and determines whether or not the preparation time period for enabling the coin C1 to be acquired from the store O4 has elapsed (S120). When determining "Yes", the user terminal 100 receives a request to acquire the coin from the store O4 (S121). At this time, an indication that the coin is ready to be acquired, which is attached to each object, is erased, and the user is allowed to visually recognize that the request to acquire the coin has been received.

The user terminal 100 calculates a game parameter value, e.g., an amount of the acquired coins based on the elapsed time period (S122). Then, the user terminal 100 transmits the game information indicating that the game parameter having a predetermined value has been given to the user to the game server 200 (S123). The game server 200 receives the information relating to the game parameter given to the user (S207), and updates the user management table 300 based on the information (S208).

As illustrated in FIG. 16, when detecting a user action exerted on the fire station O5 being a skill object (S125), the user terminal 100 determines whether or not the elapsed time period exceeds the cooldown time by referring to the elapsed time period after the fire station O5 is changed to the completed object or the elapsed time period after the skill is activated once (S126). When the cooldown time is exceeded, the user terminal 100 receives the user action to identify an effective range E3 of the fire station O5, and determines whether or not an object in which a fire has occurred is arranged within the effective range (S127). A fire has occurred in the apartment building O1 arranged within the effective range E3, and hence the user terminal 100 identifies the apartment building O1 as a target object, and conducts the processing so as to extinguish the fire in the apartment building O1 by the skill of the fire station O5 (S128). The user terminal 100 transmits the information relating to the game point or the game parameter obtained by extinguishing the fire in the apartment building O1 to the game server 200, and the game server 200 receives the information (S209), and updates the user management table 300 (S210). When the skill of the fire station O5 is activated, the fire station O5 enters a cooldown time, and the user terminal 100 resets the elapsed time period within the user management table 300 to restart the measurement, with the result that the skill is inhibited from being activated again until the elapsed time period exceeds the cooldown time (S129).

As illustrated in FIG. 17 and FIG. 18, the building arranged in the home game space G1 and a warehouse object WO stored in a warehouse W configured to store an object that cannot be arranged in the home game space G1 by the user may be each selected as a deck object DO that can be used in the competition game space G2.

As illustrated in FIG. 17, the user selects each of the road R and the object O arranged in the plane PL1 by long press and drags the same onto a deck D, to thereby be able to register the same as a deck object DO.

As illustrated in FIG. 18, a headquarters H0 being an object for selecting the deck object DO may be arranged in the plane PL1. An object arranged within an effective range E4 of the headquarters H0 is registered as the deck object DO, and can be reflected in the competition game space G2 described later under a state in which the arrangement relationship is maintained.

Figure 19:
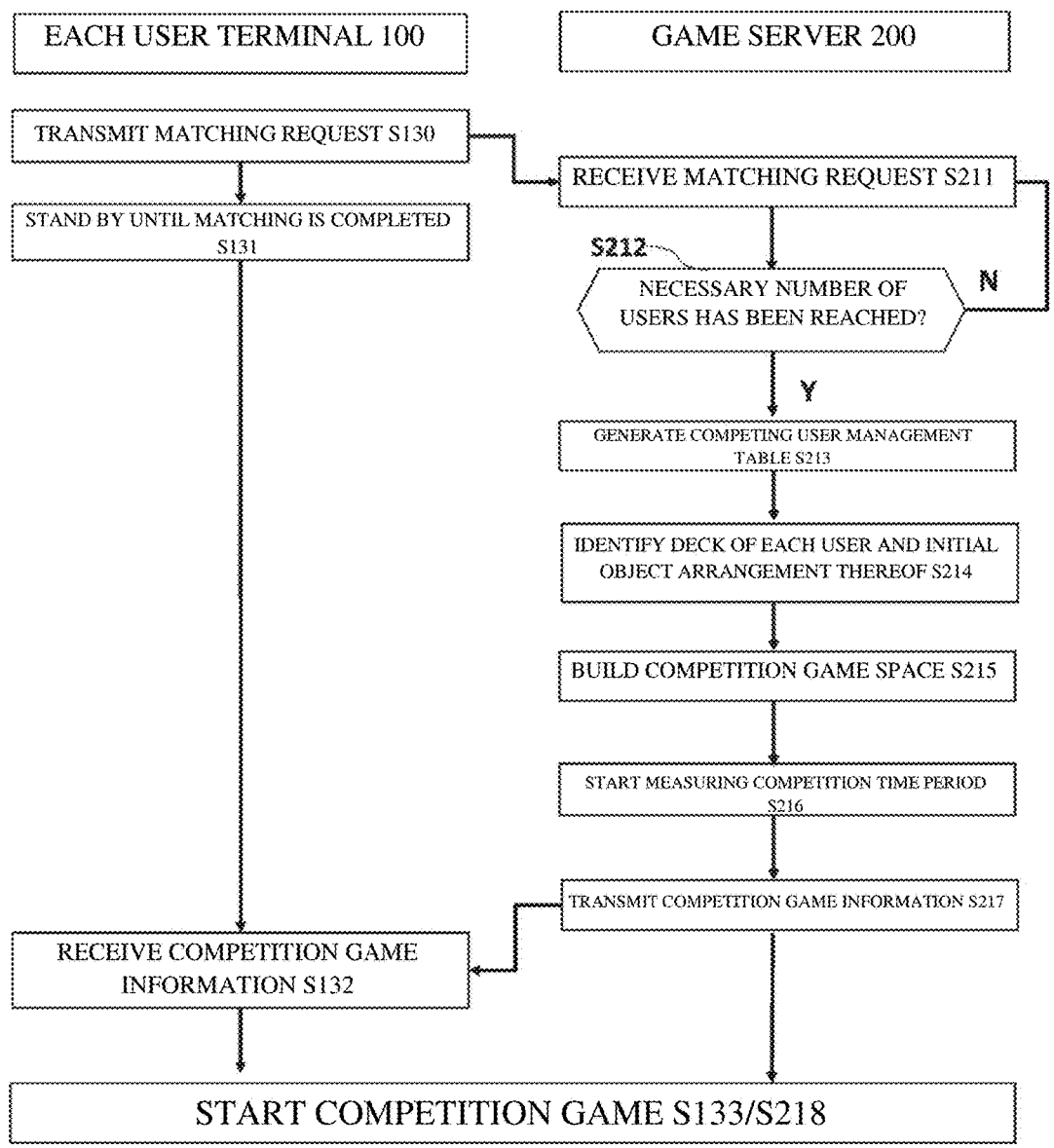
FIG. 19 is a flowchart for illustrating processing conducted by the game system according to at least one embodiment.

Next, with reference to FIG. 19, a flow of processing for switching from the home game space G1 to the competition game space G2, which is conducted by the game system 1, is described. When a given user terminal 100 transmits a matching request for starting the competition game to the game server 200 (S130), the game server 200 receives the matching request (S211). Then, the game server 200 generates a lobby for waiting for another competing user, and registers the user of interest as a matching standby user. The user terminal 100 is to be kept in a standby state until the matching with a competing opponent is completed (S131).

The game server 200 receives a matching request from another user terminal 100 in the same manner, and when determining that the number of matching standby users identified in the lobby has reached a predetermined number (S212), generates a competing user management table 340 illustrated in, for example, FIG. 20 (S213). In the competing user management table 340, an initial state common to all the users is set without inheriting the game parameters including the possessed coins and the possessed items from the home game space G1 (by using game parameters different from those of the home game space G1). Meanwhile, a part of the game parameters including the possessed diamonds is set to be inherited from the home game space G1 (set equal to those of the home game space G1). The deck object DO set in the home game space G1 is set as a possessed object. At this time, as illustrated in FIG. 17, when the deck object DO is selected by moving the deck object DO to the deck D, every deck object DO is stored in the warehouse W in the initial state. Meanwhile, as illustrated in FIG. 18, when the deck object DO is selected based on the effective range of the headquarters H0, an initial arrangement position of the deck object DO within the competition game space G2 is identified (S214).

The game server 200 builds the competition game space G2 to be shared by the competing users (S215), starts measuring the competition time period (S216), and then transmits the competition game information including the above-mentioned information to each user terminal (S217), to thereby start the competition game (S218). Each user terminal receives the competition game information (S132), to thereby start the competition game (S133). The competition time period is a time period during which a competition game is played in the competition game space G2. After the competition is started, the competition game is ended after a lapse of a predetermined competition time period, and a game object is inhibited from being arranged in the competition game space G2. The competition game information includes information relating to a time at which the measurement of the competition time period was started and a time at which the competition is to be ended, to thereby allow the elapsed time period within the competition game space G2 to be shared by the respective user terminals 100. In at least one embodiment, the competition time period is selectable from a plurality of competition time periods different in duration.

Figure 21:
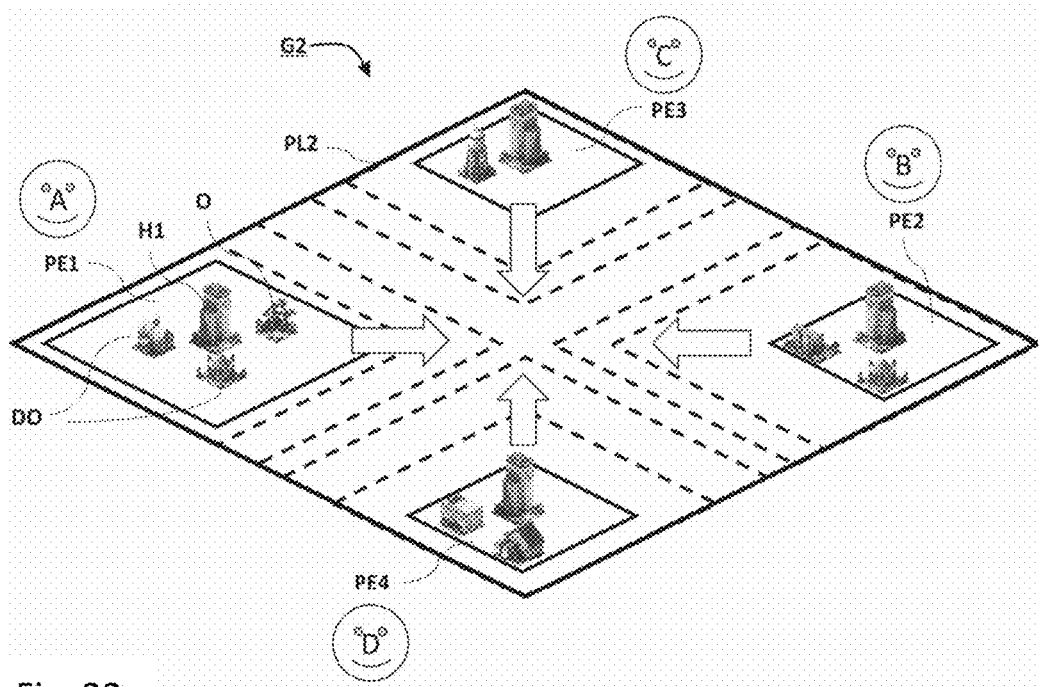
FIG. 21 is a diagram for illustrating at least one example of the competition game space.
Figure 22:
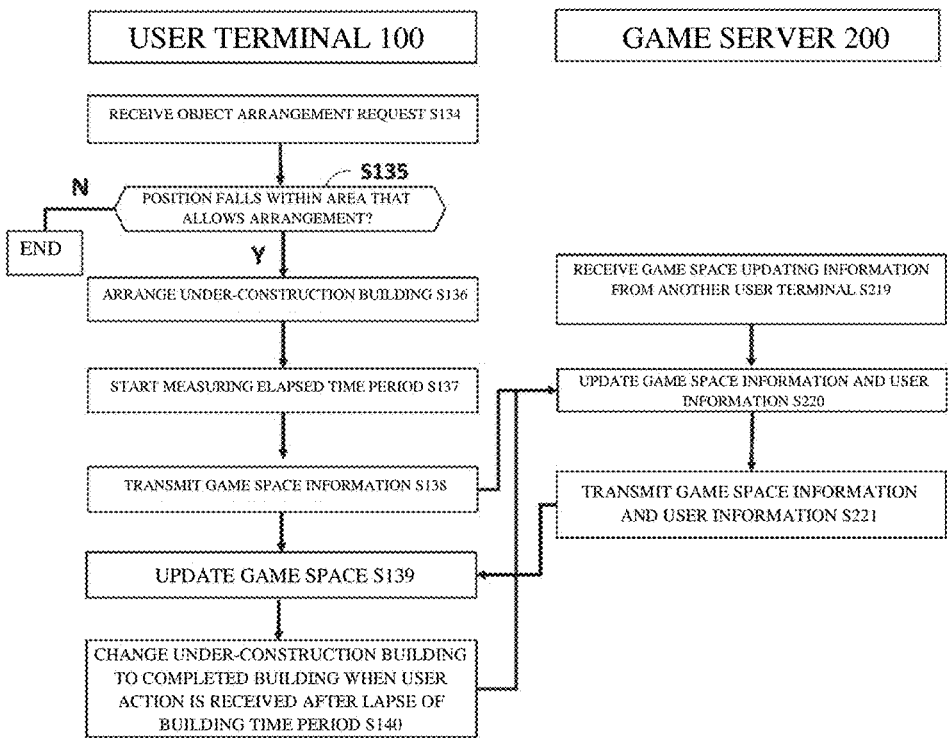
FIG. 22 is a flowchart for illustrating processing conducted by the game system according to at least one embodiment.
Figure 25:
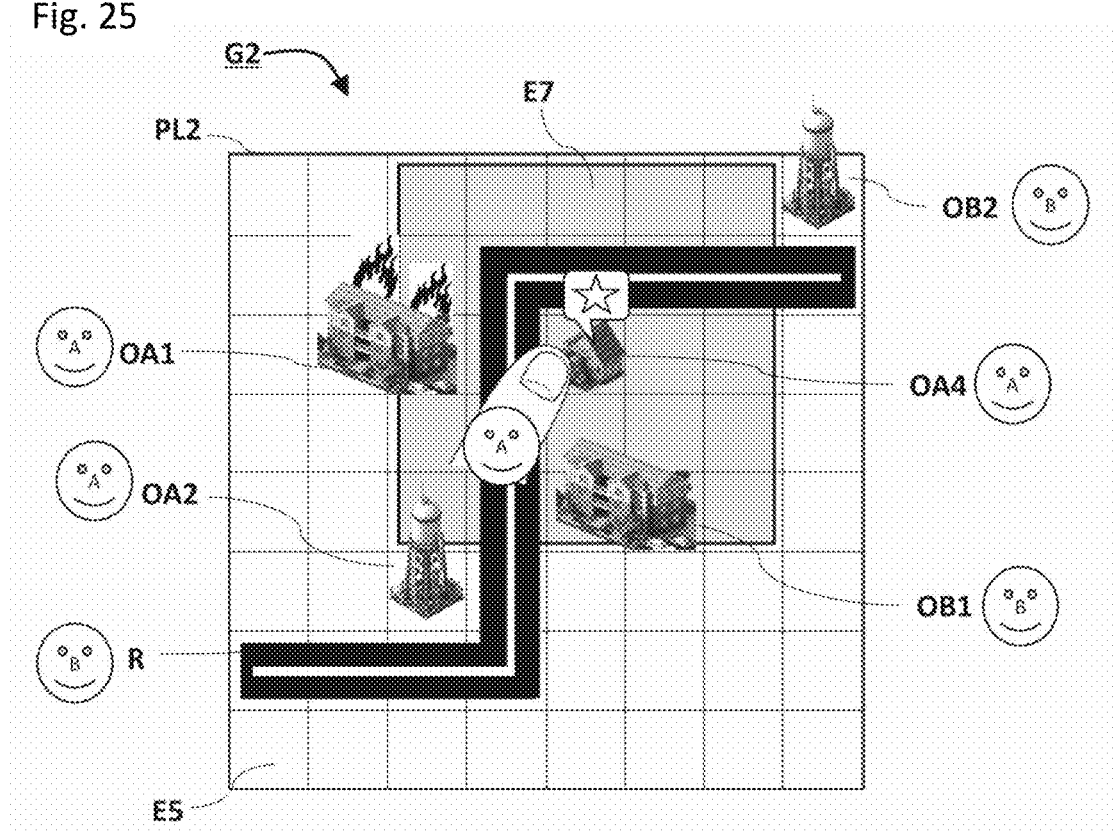
FIG. 25 is a diagram for illustrating at least one example of the competition game space.
Figure 26:
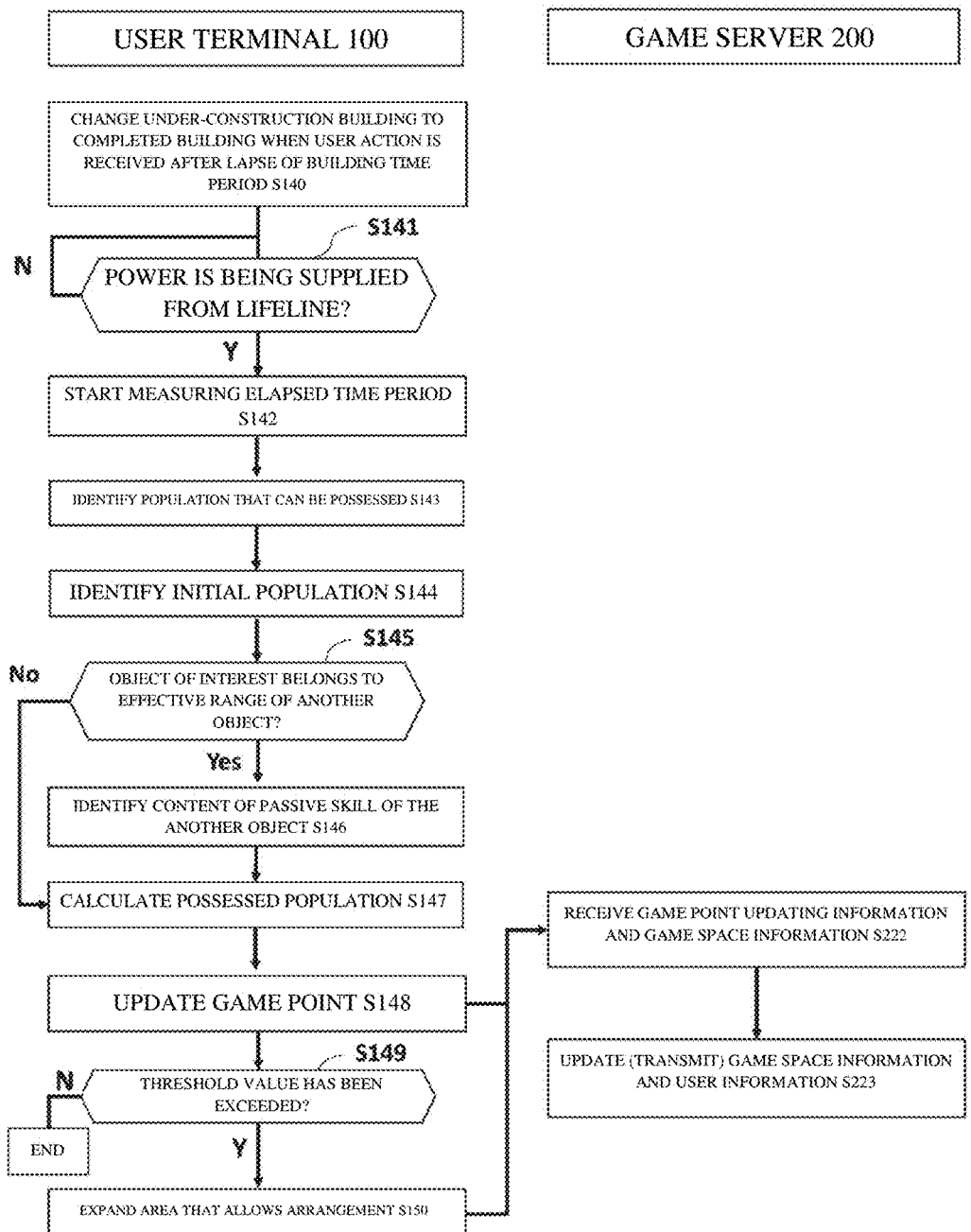
FIG. 26 is a flowchart for illustrating processing conducted by the game system according to at least one embodiment.
Figure 30:
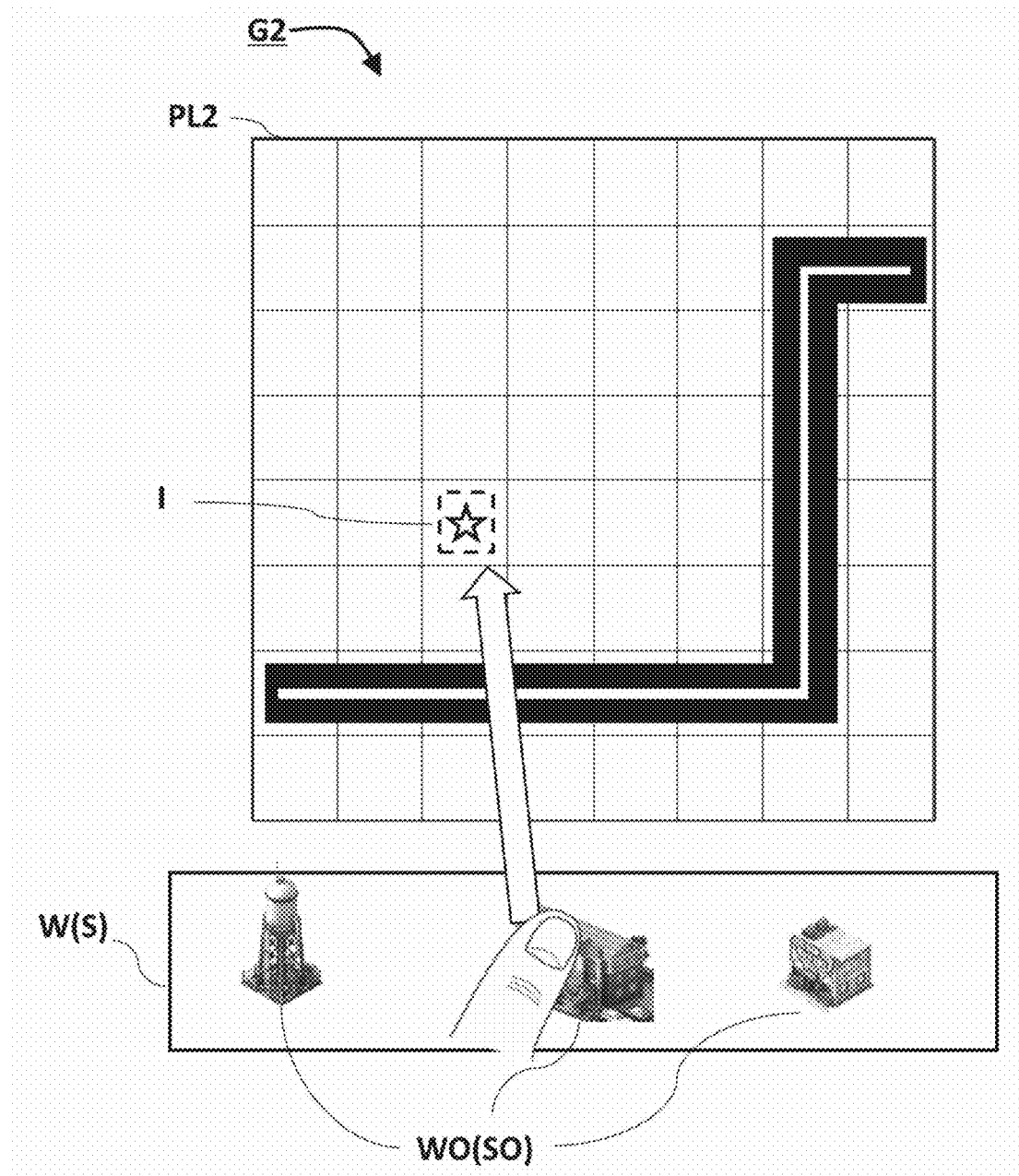
FIG. 30 is a diagram for illustrating at least one example of the competition game space.
Figure 31:
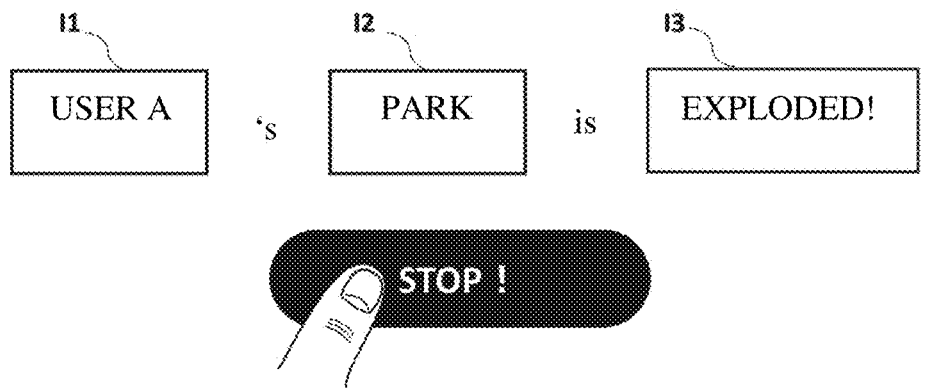
FIG. 31 is a diagram for illustrating at least one example of event slots.
Figure 32:
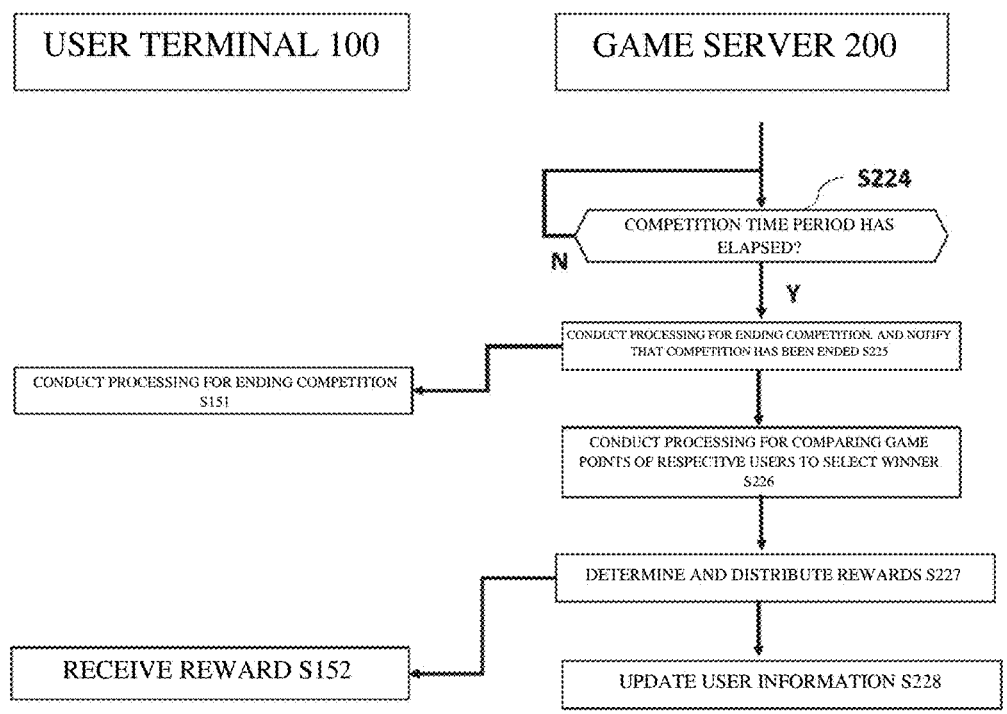
FIG. 32 is a flowchart for illustrating processing conducted by the game system according to at least one embodiment.

With reference to FIG. 21 to FIG. 32, a flow of the game progress processing conducted in the competition game space G2 is described in detail. With reference to FIG. 21 to FIG. 26, processing for giving a game point to a user based on the arranging of a building in the competition game space G2 as a game object is described. With reference to FIG. 27 to FIG. 31, an example of a game element for enhancing game enjoyment in the competition game, which is to be achieved in the competition game space G2, is described. With reference to FIG. 32, processing for determining a winner of the competition game based on the game points given to the respective users after the competition game is ended is described. FIG. 22, FIG. 26, and FIG. 32 are flowcharts for illustrating processing of the game system for causing the computer to execute those functions. FIG. 21, FIG. 23 to FIG. 25, FIG. 27, and FIG. 29 to FIG. 31 are illustrations of examples of the competition game space G2.

When the matching of the competing users is completed, the competition game space G2 illustrated in FIG. 21 is displayed on each user terminal 100. A plane PL2 within the competition game space G2 is associated with the users A to D, and allows the users A to D to arrange their game objects therein. Meanwhile, the plane PL2 includes a first area PE1 associated with the user A, a second area PE2 associated with the user B, a third area PE3 associated with the user C, and a fourth area PE4 associated with the user D. The user A is allowed to arrange the game object O only in the first area PE1. The user B is allowed to arrange the game object O only in the second area PE2. The user C is allowed to arrange the game object O only in the third area PE3. The user D is allowed to arrange the game object O only in the fourth area PE4. Only the first area PE1 is displayed on the display unit 132 of the user terminal 100-1 of the user A in a visually recognizable manner, only the second area PE2 is displayed on the display unit 132 of the user terminal 100-2 of the user B in a visually recognizable manner, only the third area PE3 is displayed on the display unit 132 of the user terminal 100-3 of the user C in a visually recognizable manner, and only the fourth area PE4 is displayed on the display unit 132 of the user terminal 100-4 of the user D in a visually recognizable manner. Therefore, the user A cannot visually recognize the second area PE2 to the fourth area PE4.

The first area PE1 to the fourth area PE4 include headquarters H1 to H4 associated with the users A to D, respectively. When the objects arranged within the effective range E4 of the headquarter H0 in the home game space G1 are registered as the deck objects DO as illustrated in FIG. 18, the deck objects DO may be reflected in a region including the headquarters H1 to H4 within the first area PE1 to the fourth area PE4 when the game is started. With this arrangement, when the competition game is started, the deck objects DO arranged within the effective range E4 can be reflected in the competition game space G2 under a state in which the arrangement relationship is maintained, which improves convenience for the user.

In the same manner as in the home game space G1, the users A to D are allowed to arrange the game object O in the plane PL2 (first area PE1 to fourth area PE4). In the same manner as in FIG. 10, a predetermined object is selected by long press from among the shop objects SO included in the shop S displayed on the user terminal 100, and is dragged to a predetermined position in the plane PL2 within the competition game space G2. With this operation, the action reception portion 111 detects an action exerted on the input unit 131 from the user, and receives the action as an object arrangement request for arranging an object in the competition game space G2 (S134 of FIG. 22). When it is determined that the above-mentioned predetermined position falls within each of the first area PE1 to the fourth area PE4 in which each user is allowed to arrange the object (Y in S135), the under-construction building BO (in the first status) is arranged in the plane PL2 based on the object arrangement request (S136). When the under-construction building BO is arranged in the plane PL2, the timer portion 113 starts measuring the elapsed time period (S137). Then, the user terminal 100 transmits, to the game server 200, the game space information indicating that the object has been arranged in the competition game space G2 and indicating a time at which the measurement of the elapsed time period was started (S138).

The game server 200 receives the information relating to the objects arranged by the respective users (S219), and updates the user management table 340 based on the information (S220). With this configuration, the game space information based on the arrangement of the objects arranged in the competition game space G2 by the respective users and the game points and the game parameters possessed by the competing users A to D are centrally managed. Then, the game server 200 transmits the game space information and the user information to the respective user terminals 100 (S221), to thereby allow the user terminals to share the game space information and the user information and update the competition game space G2 in real time.

When the elapsed time period of the under-construction building exceeds the building time period set for each object, and when a user action (for example, tap operation) exerted on the under-construction object BO is further received, the under-construction building BO changes to the completed building O (S140). Such information indicating that the completed building O has been arranged in the competition game space G2 is transmitted to the game server 200 as the game space information, and shared by the other user terminals (S220 and S221).

Figure 23:
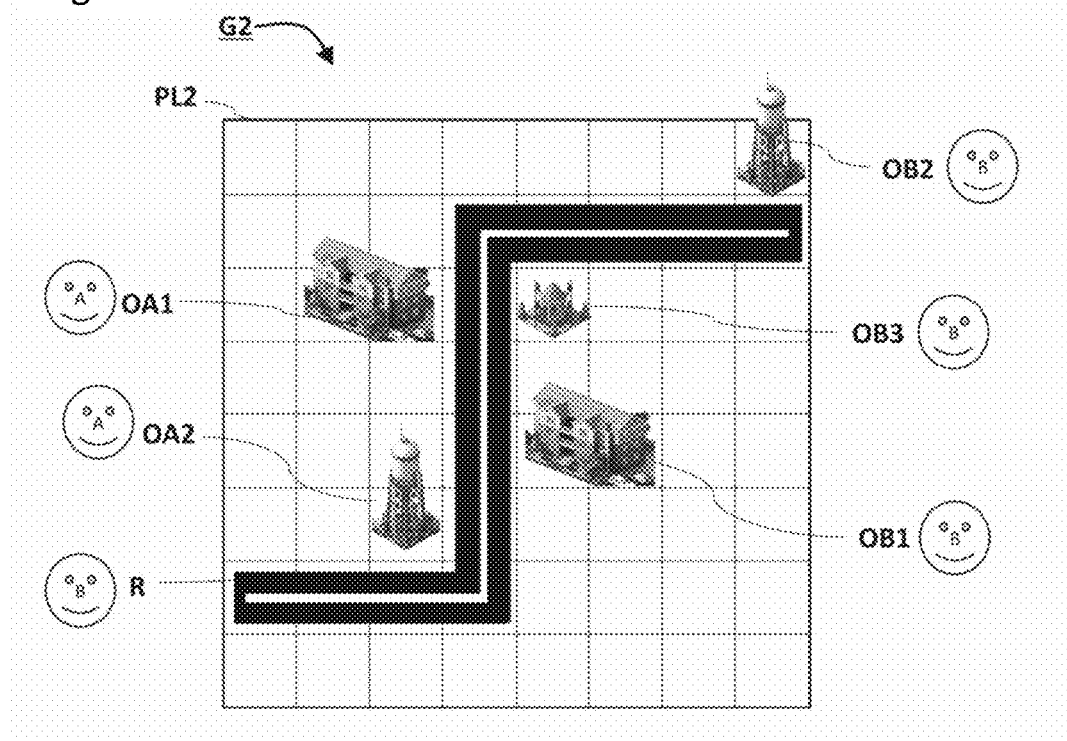
FIG. 23 is a diagram for illustrating at least one example of the competition game space.
Figure 24:
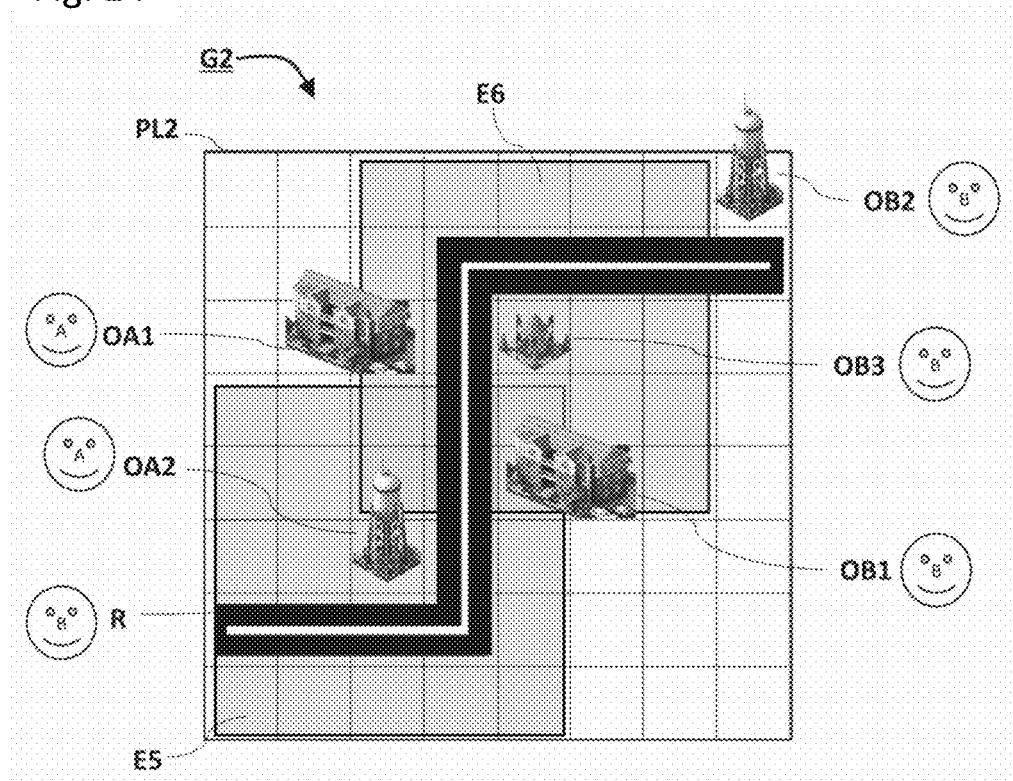
FIG. 24 is a diagram for illustrating at least one example of the competition game space.

When completed buildings OA1, OA2, and OB1 to OB3 are arranged in the competition game space G2 as illustrated in FIG. 23 (S140 of FIG. 26), the user terminal 100 determines whether or not power is being supplied from the lifeline to each of the completed objects (S141). An apartment building OA1 and a power plant OA2 are associated with the user A, and an apartment building OB1, a power plant OB2, a park OB3, and the road R are associated with the user B. The power plant OA2 and the power plant OB2 serving as lifelines are arranged adjacently to the road R, and hence the power being the game parameter is supplied to the objects adjacent to the road R. In at least one embodiment, the road R can be shared by the users, the power plant OA2 provides power to the object associated with the user A via the road R associated with the user B, and the power plant OB2 provides power to the object associated with the user B via the road R associated with the user B. Therefore, the apartment building OA1 is brought into operation by power supplied from the power plant OA2, and the apartment building OB1 is brought into operation by power supplied from the power plant OB2. The park OB3 needs no power, and is therefore brought into operation without the need to be adjacent to the road R. The game objects associated with the first user can be associated with one another by the game object associated with the second user. By thus allowing the respective users to share a part of objects, e.g., the road R, each user needs to plan his/her own game object arrangement in consideration of the object arrangement of a competing opponent, which can enhance the importance of the strategic thinking in the city-building element or the like.

When each of the completed buildings OA1, OA2, and OB1 to OB3 is brought into operation, the user terminal 100 starts receiving a user action exerted on the object, and as described later, the processing is conducted so that the user terminal 100 becomes ready to receive the acquisition of the game parameter based on the object and the activation of a skill (in the second status). When the under-construction building changes to the completed building, the timer portion 113 starts measuring the elapsed time period of each of the objects OA1, OA2, and OB1 to OB3 (S142). Then, the game point (for example, population P) associated with the object, which is acquired by arranging the object in the competition game space G2, is given to the user.

At this time, the user terminal 100 calculates the possessed population of each object (S147), to thereby calculate the game point associated with the user. In at least one embodiment, the apartment building OA1 and the apartment building OA1 serve as objects that can possess populations. First, the user terminal 100 refers to object management table 310 to identify the populations that can be possessed by the apartment buildings OA1 and OB2 (S143), and identifies initial populations allowed to be possessed by arranging the apartment buildings OA1 and OB2 in the plane PL2 (S144).

Subsequently, the user terminal 100 calculates changes in the populations possessed by the apartment buildings OA1 and OB2, which are exhibited depending on the skill of another object. First, the user terminal 100 determines whether or not the apartment buildings OA1 and OB2 belong to the effective range of another object (S145). At this time, the user terminal 100 refers to the object management table 310 and a passive skill management table 320 to identify the effective range of the object having a passive skill among the completed buildings OA1, OA2, and OB1 to OB3 arranged in the plane PL2, and identifies the object at least a part of which is arranged within the effective range. In at least one embodiment, the apartment building OB1 is arranged within an effective range E5 of the power plant OA2, and a part of the apartment building OA1 and the apartment building OB1 are arranged within an effective range E6 of the park OB3.

The apartment building OA1 is identified to belong to the effective range E6 of the park OB3 (Y in S145). Therefore, after identifying the content of the passive skill of the park OB3 (S146), the user terminal 100 calculates the possessed population of the apartment building OA1 by adding a population increase amount that is based on the passive skill of the park OB3 to the initial population (S147). Meanwhile, the apartment building OB1 is identified to belong to the effective range E5 of the power plant OA2 and the effective range E6 of the park OB3 (Y in S145). Therefore, after identifying the contents of the passive skills of the power plant OA2 and the park OB3 (S146), the user terminal 100 calculates the possessed population of the apartment building OB1 by adding a population increase amount that is based on the passive skill of the park OB3 to the initial population and subtracting a population decrease amount that is based on the passive skill of the power plant OA2 from the initial population (S147). The user terminal 100-1 associated with the user A transmits the possessed population obtained by arranging the apartment building OA1 in the game space to the game server 200 as the game point information, and the user terminal 100-2 associated with the user B transmits the possessed population obtained by arranging the apartment building OB1 in the game space to the game server 200 as the game point information (S148). The game server 200 receives the information relating to the game point (S222), updates the user management table 300 based on the information, and transmits the updated information to each user terminal 100 (S223).

In at least one embodiment, a game point value updated by arranging each object at this time is equal to a game point value updated by arranging the object in the home game space G1. That is, in at least one embodiment, the population that is possessed by the possessed object identified in the competing user management table 340 and the value of the possessed population to be updated by the passive skill is set based on the user management table 300, the object management table 310, and the skill management tables 320 and 330. This allows the user to advantageously advance the competition game by raising the game object in the home game space G1, which can enhance the game enjoyment in the home game space G1.

An effective range E7 of the active skill of a fire station OA4 associated with the user A, which is illustrated in FIG. 25, may be employed as the effective range identified in Step S145 for determining whether or not to belong to the effective range of another building. Processing conducted in this case is the same as the processing illustrated in FIG. 16, but only a user action exerted by the user A is set to be received for the fire station OA4, which allows the effective range E7 to be identified. When a fire has occurred in the apartment building OA1 arranged within the effective range E7, the fire is extinguished by the active skill of the fire station OA4, and the game parameter is updated so as to bring the apartment building OA1 into operation again.

The active skill may change only the game point and the game parameter of the object, which is associated with the user A and the skill of which has been activated, among the objects arranged within the effective range. That is, when the apartment building OA1 in which a fire has occurred is associated with the user B, the fire may be inhibited from being extinguished by the active skill of the fire station OA4. The above-mentioned passive skill may also change the game point and the game parameter of the object associated with the user associated with the object the skill of which is to be activated among the objects arranged within the effective range.

The building time period and the cooldown time of each object within the competition game space G2 may differ from the building time period and the cooldown time of each object within the home game space G1. When the competition time period is selectable from a plurality of competition time periods different in duration, the building time period and the cooldown time may be changed depending on the competition time period. For example, in at least one embodiment, the building time period and the cooldown time are set short when the competition time period is short. This allows the speediness of the game progress within the competition game space G2 to differ depending on the competition time period, and hence the user can easily enjoy the competition game.

After updating the game point as described above (S148), the user terminal 100 determines whether or not the updated game point exceeds a threshold value (S149). When it is determined that the threshold value is exceeded, the size of the area associated with the user of interest among the first area PE1 to the fourth area PE4 is enlarged as indicated by the broken lines in FIG. 21 (S150). With this configuration, the flexibility of the game increases as the game progresses, which enhances the game enjoyment in the city-building element or the like. When the game point decreases, the size of the corresponding one of the first area PE1 to the fourth area PE4 may be reduced depending on a decrease amount.

The first area PE1 to the fourth area PE4 may be set large at first, and then the size of the corresponding one of the first area PE1 to the fourth area PE4 may be reduced depending on the game point of each user. The game is thus caused to become less flexible as the game progresses so that the user is required to arrange the objects more strategically than in an earlier stage.

In at least one embodiment, each user is allowed to associate (so-called "purchase") the object of another user with himself/herself in exchange for his/her own game point or a predetermined game parameter (for example, coins serving as the in-game currency). This allows the importance of the strategic thinking in the city-building element or the like to be enhanced.

A description is made of an exemplary case where, as illustrated in FIG. 27, the user A purchases an apartment building OB4 associated with the user B. In this embodiment, the user A is allowed to purchase the object that is arranged in the first area PE1 and associated with any one of the other users B to D. The apartment building OB4 is arranged in the first area PE1, and is also arranged in the second area PE2. Therefore, when the size of the first area PE1 is set to be enlarged based on the game point or another game parameter of the user A as described above, the flexibility in the arrangement of the object increases as the game progresses, while there arises the need to take or protect space for arranging an object from another user. This allows the game enjoyment in the city-building element or the like to be enhanced.

In at least one embodiment, the game point and the game parameter necessary to purchase an object of another user is defined based on each object and the type of the object as shown in FIG. 28. In at least one embodiment, a reference price is set for each object. A utilization degree, which is a degree to which an object of interest is utilized in the competition game space G2, is calculated based on a purchase price calculation table 350, and a value obtained by multiplying the reference price by the utilization degree is set as a purchase price. Each user can purchase a target object with a 100% chance when the user pays coins (first value) corresponding to the purchase price. Meanwhile, when the user pays coins (second value) having an amount smaller than the purchase price, a purchase chance is set based on a ratio of a payment amount to the purchase price. Each user can decide the payment amount in consideration of his/her possessed amount of the coins and the purchase chance.

In at least one embodiment, the utilization degree of a given object within the competition game space G2 is calculated based on a degree of an influence exerted on another object by the given object. As shown in FIG. 28, a ratio of an actually possessed population to the population that can be possessed is set as the utilization degree of an apartment building. A ratio of the size (number of cells) of an object on which the influence is exerted to the size (number of cells) of the effective range is set as the utilization degrees of a park and a fire station. A ratio of the total value of power (power consumption amount) being actually consumed by a building to a power supply amount is set as the utilization degree of a power plant. This allows an object having high importance and being often utilized in the competition game space G2 by the user to be made difficult to purchase. With this configuration, preventing an irrational change in the game situation (competition situation) due to the purchase of the game object is possible, which enhances the game enjoyment in the city-building element or the like. An object that is not changed in the purchase price based on the utilization degree, e.g., a shop or farmland, may be included.

Figure 29:
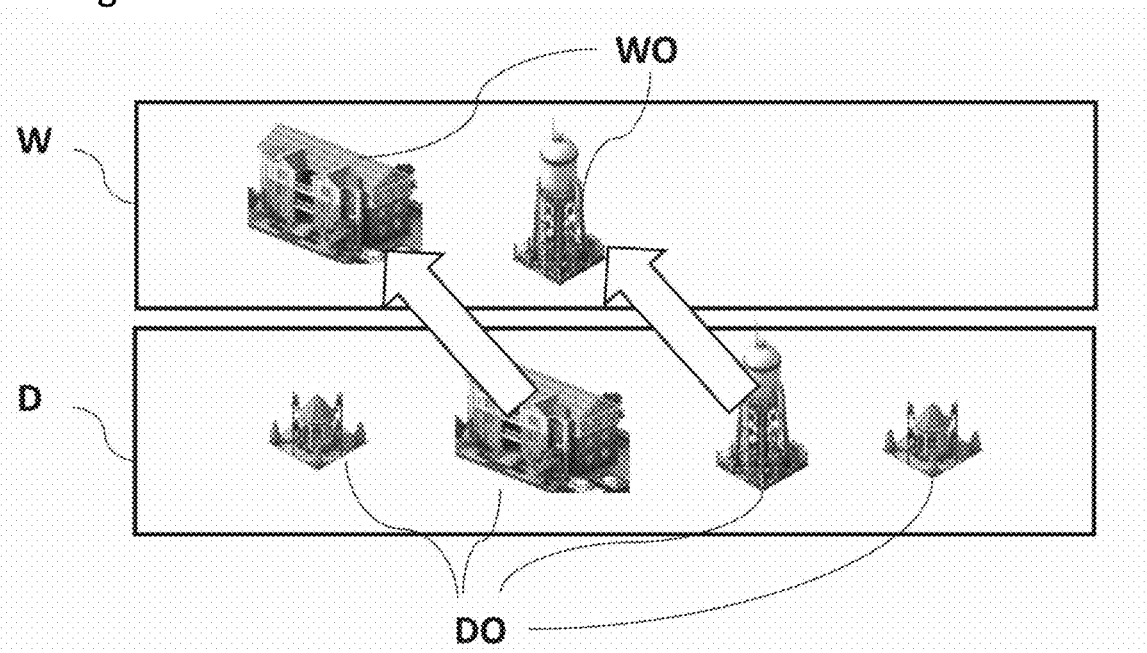
FIG. 29 is a diagram for illustrating at least one example of the competition game space.

The deck object DO registered in the deck D in the home game space G1 as illustrated in FIG. 17 may be set to be stored in the warehouse W in the competition game space G2 when the competition is started as described above. However, as illustrated in FIG. 29, an object selected at random from a predetermined number of deck objects DO may also be set to be newly stored in the warehouse W as the warehouse object WO each time the elapsed time period within the competition game space G2 exceeds a fixed time period (transfer time period). In this case, the deck objects DO stored in the warehouse W when the game is started are a part of the deck objects DO registered in the deck D. In the competition game, which is influenced by a degree of raising the object in the home game space G1, the user is not allowed to arrange all the deck objects DO when the game is started, to thereby be able to avoid a situation in which the win-loss outcome of the competition game is determined in an early stage immediately after the game is started.

The user may be allowed to arrange a predetermined number of game objects (transferred as the warehouse objects WO) in the competition game space G2 among the deck objects DO before the measurement of the competition time period is started when the competition game is started. This allows the user to determine the arrangement position of the warehouse object WO before the competition is started. With this configuration, the user does not need to hurry to determine the arrangement position of the game object when the competition is started, and can therefore easily enjoy the competition game.

As illustrated in FIG. 30, an event occurrence region I may be set in the competition game space G2. Then, a predetermined event may be set to occur at a timing at which the game object O being the completed building is arranged in the event occurrence region I. With this configuration, an event can be caused to occur in the game with a trigger that the user has arranged the game object O in the competition game space G2.

The timing at which the game object O being the completed building is arranged in the event occurrence region I represents a timing at which the warehouse object WO is arranged in the plane PL2 from the warehouse W. Meanwhile, in at least one embodiment, the shop object SO is arranged after being bought from the shop S at a timing at which the under-construction building BO changes to the completed building rather than at the timing at which the under-construction building BO is arranged. Once an event occurs, in at least one embodiment, the next event is inhibited from occurring during a fixed time period. In this case, once an event occurs, another event occurrence region I may be inhibited from occurring during a fixed time period, the existing event occurrence region I may be caused to disappear, or the function of the event occurrence region I may be nullified to prevent an event from occurring even when the game object O is arranged therein. With this configuration, avoiding a situation in which events frequently occur during the game is possible.

In at least one embodiment, the above-mentioned in-game event is determined as illustrated in FIG. 31 by event slots for specifying an event user I1, an event object I2, and a happening I3. When the user arranges an object in the event occurrence region I, the event slots start rotating. When the user taps a "STOP" button, the event user I1, the event object I2, and the happening I3 are identified. This allows an accidental happening to occur in the game object arranged in the competition game space, which enhances the game enjoyment in the city-building element or the like. The user can also discard the event by keeping himself/herself from tapping the "STOP" button during a predetermined time period.

When the elapsed time period within the competition game space G2 exceeds the predetermined competition time period (Y in S224 of FIG. 32), the game server 200 conducts processing so as to inhibit a game object from being arranged in the competition game space G2 as processing for ending the competition game (S225). The game server 200 notifies each user terminal 100 that the competition has been ended, while each user terminal 100 also conducts processing so as to inhibit a game object from being arranged in the competition game space G2 as the processing for ending the competition game (S151).

When the competition game is ended, the game server 200 executes processing for comparing the game points of the respective users to select the winner (S226). In at least one embodiment, the winner is selected by comparing the populations P as the game points associated with the respective users. The population P associated with each user is calculated by referring to the competing user management table 340 to sum up the possessed populations associated with the buildings associated with each user.

In the selection of the winner, the rank of each user may be determined based on the value of the population P. In addition to the population P, the game parameters including the in-game currency, e.g., the coin, and the in-game item may be taken into consideration. For example, the win-loss outcome may be determined based on a total value of the population P and the coins C, or may be determined based on a weighted average in which any one of the population P and the coins C is weighted. Other elements including the occupancy rate of the game space G may be taken into consideration as well.

After selecting the winner and the ranks of the respective users, the game server 200 determines the rewards to be distributed to the respective users, transmits information on the rewards to be distributed to the respective user terminals 100 (S227), and updates the user management table 300 so as to add the rewards (S228). After receiving the reward (S152), each user terminal 100 shifts to the home game space G1 in which the reward is reflected.

The above-mentioned embodiment is merely an example for facilitating an understanding of this disclosure, and is not intended to limit an interpretation of this disclosure. It should be understood that changes and modifications can be made to this disclosure without departing from the gist of this disclosure, and that this disclosure includes equivalents thereof.

For example, the description of the above-mentioned at least one embodiment is directed to a mode in which the processing for arranging various objects in the game space G and the processing for calculating the game point value given by the skill object are executed by the user terminal 100, and the resultant game space information and the game information including the game point value are transmitted from the user terminal 100 to the game server 200. However, the processing may be executed by the game server 200. For example, the user terminal 100 may be configured to transmit the information on a predetermined user action that has been received to the game server 200, and the game server 200 may be configured to carry out processing for updating the game space based on the user action and processing for updating the game point value, and to transmit the resultant game information to the user terminal 100. The user terminal 100 can execute processing for building the game space G based on the game information received from the game server 200.

Further, the processing for acquiring (so-called "purchasing") the game object associated with another user in exchange for the game point or the predetermined game parameter may be applied to a game object arranged outside an area in which the user's own game object can be arranged in the competition game space G2. Further, the "purchasing" function can be applied to the home game space G1. For example, the user A may be allowed to acquire a game object arranged in the home game space G1 of the user B when the user A visits the home game space G1 of the user B. In that case, in at least one embodiment, the purchase price and the purchase chance are calculated based on the purchase price calculation table 350 shown in FIG. 28.

Further, the event slots illustrated in FIG. 31 may be applied to the home game space G1. With this configuration, introducing an element of luck into the city-building element within the home game space G1 is possible, and the user needs to cope with an unexpected disaster, e.g., a fire, which can enhance the game enjoyment. In this case, in at least one embodiment, the event slots specify the event object I2 and the happening I3.

What is claimed is:
1. A gaming system comprising:
a non-transitory computer readable medium for storing a game program; and
a computer connected to the non-transitory computer readable medium, wherein the computer is configured to execute the game program for:
building a competition game space to be shared by a plurality of users including a first user and a second user through a network;
updating a game point, which is associated with a predetermined user of the plurality of users and a game object associated with the predetermined user, based on arranging of the game object in the competition game space;

conducting processing so as to inhibit the game object from being arranged in the competition game space after a competition time period has elapsed since the competition game space is built; and comparing the game points associated with each user of the plurality of users to select a winner, wherein:

the game object has a first status that inhibits the action exerted by the first user from being received and a second status that allows the action input from the first user to be received;

a first object in the first status is set to change to the second status after one of a building time period or a preparation time period has elapsed; and one of the building time period or the preparation time period within the home game space and one of the building time period or the preparation time period within the competition game space are different.

2. The gaming system according to claim 1, wherein the computer is further configured to execute the game program for:

arranging a first object and a second object associated with the first user in the competition game space;

arranging a third object associated with the second user in the competition game space;

identifying an effective range of the first object;

determining whether at least a part of one of the second object or the third object is arranged within the effective range; and updating one of the game point or a predetermined game parameter, which is associated with the one of the second object or the third object arranged within the effective range.

3. The gaming system according to claim 2, wherein the effective range of the first object is identified by receiving an action input from the first user on the first object.

4. The gaming system according to claim 1, wherein: the computer to execute the game program for:

arranging a first object and a second object associated with the first user in the competition game space; and arranging a third object and a fourth object associated with the second user in the competition game space; and the predetermined game parameter is provided from the second object to the first object by associating the first object and the second object with each other by the fourth object.

5. The gaming system according to claim 1, wherein: the competition game space comprises a first area in which the game object associated with the first user is able to be arranged; and the game program further causes the computer to execute a step of changing a size of the first area based on one of the game point or a predetermined game parameter, which is associated with the first user.

6. The gaming system according to claim 1, wherein: the competition game space comprises:

a first area in which the game object associated with the first user is able to be arranged; and a second area in which the game object associated with the second user is able to be arranged; and the game program further causes the computer to execute a step of displaying only the first area in the competition game space in a visually recognizable manner.

7. The gaming system according to claim 1, wherein: the competition game space comprises:

a first area in which the game object associated with the first user is able to be arranged; and a second area in which the game object associated with the second user is able to be arranged; and the game program further causes the computer to execute a step of associating a second object, which is arranged in the first area and associated with the second user, with the first user in exchange for one of the game point or the predetermined game parameter, which is associated with the first user.

8. The gaming system according to claim 7, wherein a value of one of the game point or the predetermined game parameter is determined based on a utilization degree, wherein the utilization degree is a degree of an influence exerted on another object by a second object.

9. The gaming system according to claim 1, wherein: the computer to further configured to execute of the game program for building a home game space in which only the game object associated with the first user is to be arranged; and the home game space displayed on the computer switcheable to the competition game space based on an action input from the first user.

10. The gaming system according to claim 9, wherein the computer to is further configured execute of the game program for selecting the game object able to be arranged in the competition game space from among a plurality of game objects associated with the first user, in the home game space based on the action input from the first user.

11. The gaming system according to claim 10, wherein: the game object arranged within a predetermined range including a predetermined one of the game objects arranged in the home game space is selected as the game object allowed to be arranged in the competition game space; and the game object arranged within the predetermined range is reflected in the competition game space under a state in which an arrangement positional relationship of the game object is maintained.

12. The gaming system according to claim 10, wherein, after a transfer time period shorter than the competition time period has elapsed in the competition game space, a predetermined number of the game objects, which are selected at random from among the game objects selected in the home game space so as to be arranged in the competition game space, are able to be arranged in the competition game space.

13. The gaming system according to claim 10, wherein, before measurement of the competition time period is started, a predetermined number of the game objects, which are selected from among the game objects selected in the home game space so as to be arranged in the competition game space, are able to be arranged in the competition game space.

14. The gaming system according to claim 10, wherein the game point obtained by arranging the game object in the home game space and the game point obtained by arranging the game object in the competition game space are the same for the game object selected in the home game space.

15. The gaming system according to claim 9, wherein the predetermined game parameter associated with the first user in the home game space is different from the predetermined game parameter associated with the first user in the competition game space.

16. The gaming system according to claim 9, wherein the predetermined game parameter associated with the first user in the home game space is the same as the predetermined game parameter associated with the first user in the competition game space.

17. The gaming system according to claim 1, wherein:
the competition time period is selectable from a plurality of the competition time periods different in duration; and
a duration of one of the building time period or the preparation time period is set based on the duration of the competition time period.

18. A gaming system comprising:
a non-transitory computer readable medium for storing a game program; and
a computer connected to the non-transitory computer readable medium, wherein the computer is configured to execute the game program for:
building a competition game space to be shared by a plurality of users including a first user and a second user through a network; and
updating a game point, which is associated with a predetermined user of the plurality of users and a game object associated with the predetermined user, based on arranging of the game object in the competition game space, wherein:

the game object has a first status that inhibits an action exerted by the first user from being received and a second status that allows the action input from the first user to be received;

a first object in the first status is set to change to the second status after one of a building time period or a preparation time period has elapsed; and one of the building time period or the preparation time period within the home game space and one of the building time period or the preparation time period within the competition game space are different.

* * * * *